(12) United States Patent
Nguyen et al.

(10) Patent No.: US 12,232,082 B2
(45) Date of Patent: Feb. 18, 2025

(54) COLLISION INDICATION AS SPS RESOURCE SELECTION TRIGGERING

(71) Applicant: QUALCOMM Incorporated, San Diego, CA (US)

(72) Inventors: Tien Viet Nguyen, Bridgewater, NJ (US); Sourjya Dutta, San Diego, CA (US); Gabi Sarkis, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 17/571,806

(22) Filed: Jan. 10, 2022

(65) Prior Publication Data

US 2022/0232519 A1    Jul. 21, 2022

Related U.S. Application Data

(60) Provisional application No. 63/138,747, filed on Jan. 18, 2021.

(51) Int. Cl.
*H04W 72/02* (2009.01)
*H04W 28/26* (2009.01)
(Continued)

(52) U.S. Cl.
CPC .......... *H04W 72/02* (2013.01); *H04W 28/26* (2013.01); *H04W 72/20* (2023.01); *H04W 72/542* (2023.01)

(58) Field of Classification Search
None
See application file for complete search history.

(56) References Cited

U.S. PATENT DOCUMENTS

2020/0178290 A1* 6/2020 Lee .................. H04W 72/20
2022/0322359 A1* 10/2022 Ye ................... H04W 72/563
(Continued)

OTHER PUBLICATIONS

Beijing Xinwei Telecom Techn: "Discussion on V2V Semi-Persistent Scheduling Procedure", Draft, 3GPP TSG RAN WG1 Meeting #84bis, R1-163154 Discussion on V2V SPS Procedure, 3rd Generation Partnership Project (3GPP), Mobile Competence Centre, 650, Route Des Lucioles, F-06921 Sophia-Antipolis Cedex, France, vol. Ran WG1, No. Busan, Korea, Apr. 11, 2016-Apr. 15, 2016 Apr. 1, 2016 (Apr. 1, 2016), 8 Pages, Retrieved from the Internet: URL: http://www.3gpp.org/ftp/tsg_ran/WG1_RL1/TSGR1_84b/Docs/ [retrieved on Apr. 1, 2016].
(Continued)

*Primary Examiner* — Saad Khawar
(74) *Attorney, Agent, or Firm* — Procopio, Cory, Hargreaves & Savitch LLP

(57) ABSTRACT

An apparatus (e.g., a third UE) may be configured to detect at least one SPS conflict in a set of REs between a first SL (e.g., an SPS-based) transmission associated with a first UE and a second SL transmission associated with a second UE. The third UE may further be configured to transmit, upon detecting the SPS conflict, an indication of the SPS conflict to at least one of the first and second UEs. A first UE may be configured to receive, from the third UE, the indication of the SPS conflict, the indication of the SPS conflict including information regarding a set of resources associated with the detected conflict. The first UE may be further configured to initiate a resource re-selection for the first SL transmission based on the received indication and to transmit the first SL transmission based on the resource re-selection.

22 Claims, 10 Drawing Sheets

(51) Int. Cl.
*H04W 72/20* (2023.01)
*H04W 72/542* (2023.01)

(56) References Cited

U.S. PATENT DOCUMENTS

2022/0417923 A1* 12/2022 Uchiyama ............... H04W 4/40
2023/0362917 A1* 11/2023 Zhang ................. H04W 72/563
2024/0057207 A1* 2/2024 Basu Mallick ....... H04W 72/25

OTHER PUBLICATIONS

Interdigital, et al., "NR SL Mode 2 Enhancement for Reliability Improvement", 3GPP Draft, 3GPP TSG RAN WG1 #103-e, R1-2009122, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020 Oct. 23, 2020 (Oct. 23, 2020), XP051945503, 4 Pages. Retrieved from the Internet: URL: https://ftp.3gpp.org/tsg_ran/WG1_RL1/TSGR1_103-e/Docs/R1-2009122.zip [retrieved on Oct. 23, 2020], p. 3, Paragraphs After Proposal 4.

International Search Report and Written Opinion-13 PCT/US2022/012042—ISA/EPO—May 9, 2022.

Qualcomm Incorporated: "Reliability and Latency Enhancements for Mode 2", 3GPP Draft, 3GPP TSG RAN WG1 Meeting #103-e, R1-2009273, 3RD Generation Partnership Project (3GPP), Mobile Competence Centre, 650, Route Des Lucioles, F-06921 Sophia-Antipolis Cedex, France, vol. RAN WG1, No. e-meeting, Oct. 26, 2020-Nov. 13, 2020, Oct. 24, 2020 (Oct. 24, 2020), XP051946936, 19 Pages, Retrieved from the Internet: URL: https://ftp.3gpp.org/tsg_ran/WG1_RL1/TSGR1_103-e/Docs/R1-2009273.zip, [retrieved-on Oct. 24, 2020] the whole document, Sections 1, 3.

Robert Bosch GMBH: "Discussion on Sidelink Mode-2 Resource Allocation Enhancements", 3GPP Draft, 3GPP TSG RAN WG1 #103-e, R1-2009127, 3rd Generation Partnership Project (3GPP), Mobile Competence Centre, 650, Route Des Lucioles, F-06921 Sophia-Antipolis Cedex, France, vol. RAN WG1, No. E-Meeting; Oct. 26, 2020-Nov. 13, 2020 Oct. 24, 2020 (Oct. 24, 2020), XP051946844, 7 Pages, Retrieved from the Internet: URL: https://ftp.3gpp.org/tsg_ran/WG1_RL1/TSGR1_103-e/Docs/R1-2009127.zip, [retrieved on Oct. 24, 2020], Sections 2.1, 2.2 and 3.

* cited by examiner

COLLISION INDICATION AS SPS RESOURCE SELECTION TRIGGERING

CROSS REFERENCE TO RELATED APPLICATION(S)

This application claims the benefit of and priority to U.S. Provisional Application Ser. No. 63/138,747, entitled "COLLISION INDICATION AS SPS RESOURCE SELECTION TRIGGERING" and filed on Jan. 18, 2021, which is expressly incorporated by reference herein in its entirety.

TECHNICAL FIELD

The present disclosure relates generally to communication systems, and more particularly, to detecting and responding to conflicts between sidelink (SL) transmissions transmitted according to semi-persistent scheduling (SPS) configurations specifying a periodicity of reserved resources for transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

SL communication resource allocation in some aspects of wireless communications (e.g., 5G NR) may not be centrally controlled. Instead, each UE may autonomously select resources for particular communications based on information available to the UE and/or based on negotiation with other UEs. Accordingly, SL transmissions from different UEs may result in conflicting communications being received in a set of resource elements (e.g., a set of time and frequency resources defined by a time period and frequency range) at a receiving UE. For SL transmissions based on SPS configurations, the potential for recurring conflicts may increase. It may be beneficial to be able to avoid recurring conflicts for SL SPS-based transmissions.

In an aspect of the disclosure, a method, a computer-readable medium, and an apparatus are provided. The apparatus may be a first device at a first UE. The first device may be a processor and/or modem at the first UE or the first UE itself. The first UE may be configured to receive, from a third UE, an indication of an SPS conflict, the indication of the SPS conflict including information regarding a set of resources with at least one conflict between a first SL (e.g., an SPS-based) transmission and a second SL transmission, the first SL transmission associated with the first UE and the second SL transmission associated with a second UE. The first UE, in some aspects, is further configured to initiate (or trigger) a resource re-selection for the first SL transmission based on the received indication of the SPS conflict. The first UE may further be configured to transmit the first SL transmission based on the resource re-selection.

In an aspect of the disclosure, a method, a computer-readable medium, and an apparatus are provided. The apparatus may be a third device at a third UE. The third device may be a processor and/or modem at the third UE or the third UE itself. The third UE may be configured to detect at least one SPS conflict in a set of time-and-frequency resources between a first SL (e.g., SPS-based) transmission and a second SL transmission, the first SL transmission being associated with the first UE and the second SL transmission being associated with the second UE. The third UE may further be configured to transmit, upon detecting the at least one SPS conflict, an indication of the SPS conflict to at least one of the first UE or the second UE, where the indication of the SPS conflict may include information regarding the detected at least one SPS conflict between the first SL transmission and the second SL transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
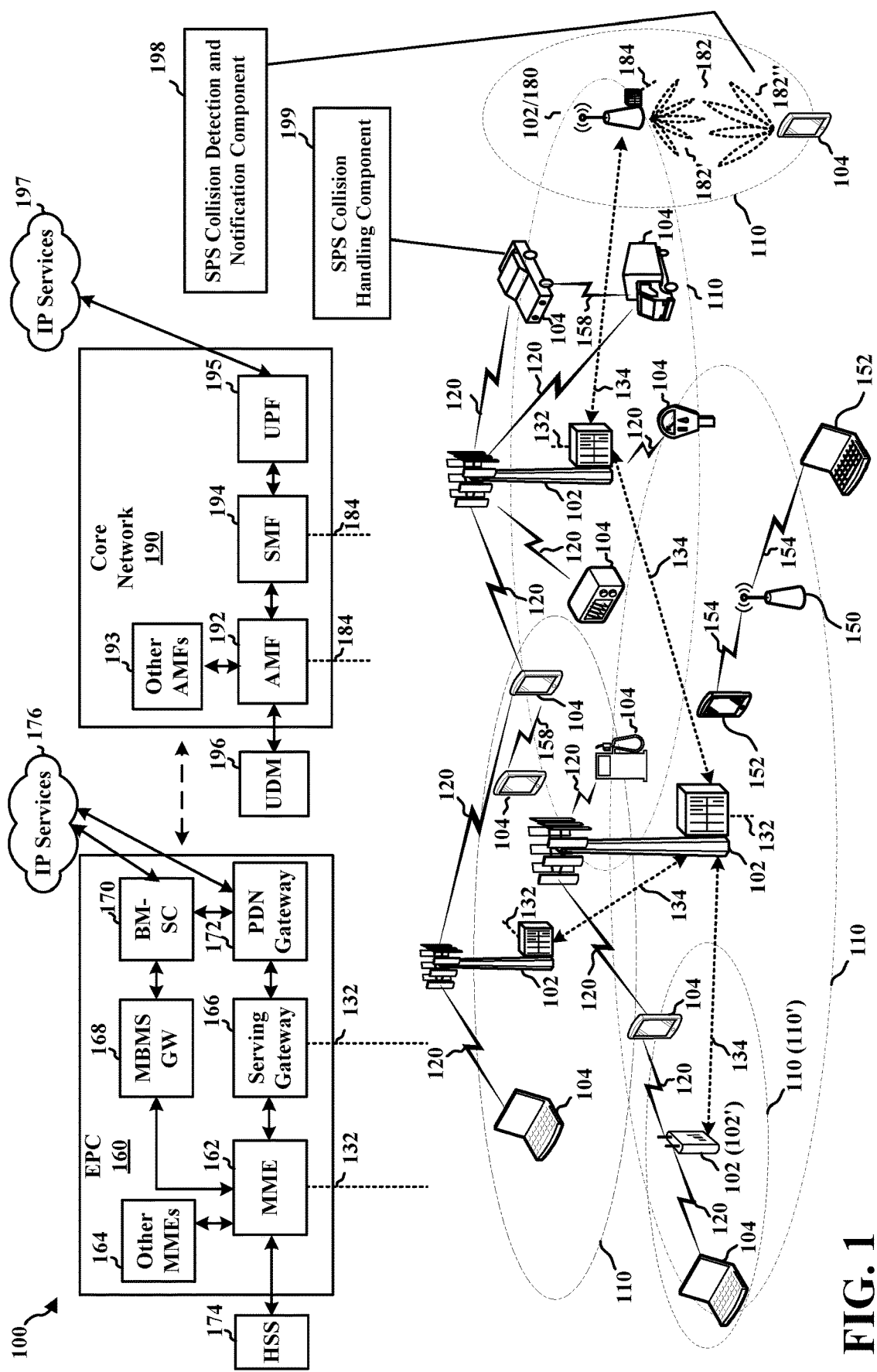
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a UE 104 (e.g., a third UE) may include an SPS collision detection and notification component 198 that may be configured to detect at least one SPS conflict in a set of resources between a first SL transmission and a second SL transmission, where the first SL transmission is associated with a first UE and the second SL transmission is associated with a second UE; and transmit, upon detecting the at least one SPS conflict, an indication of the SPS conflict to at least one of the first UE or the second UE, where the indication of the SPS conflict may include information regarding the detected at least one SPS conflict between the first SL transmission and the second SL transmission. In certain aspects, a UE 104 (e.g., a first UE) may include an SPS collision handling component 199 that may be configured to receive, from a third UE, an indication of an SPS conflict, the indication of the SPS conflict including information regarding a set of resources with at least one conflict between a first SL transmission and a second SL transmission, the first SL associated with the first UE and a second SL transmission associated with a second UE; initiate (or trigger) a resource re-selection for the first SL transmission based on the received indication of the SPS conflict; and transmit the first SL transmission based on the resource re-selection. Although the following description may be focused on 5G NR, the concepts described herein may be applicable to other similar areas, such as LTE, LTE-A, CDMA, GSM, and other wireless technologies.

Figure 2:
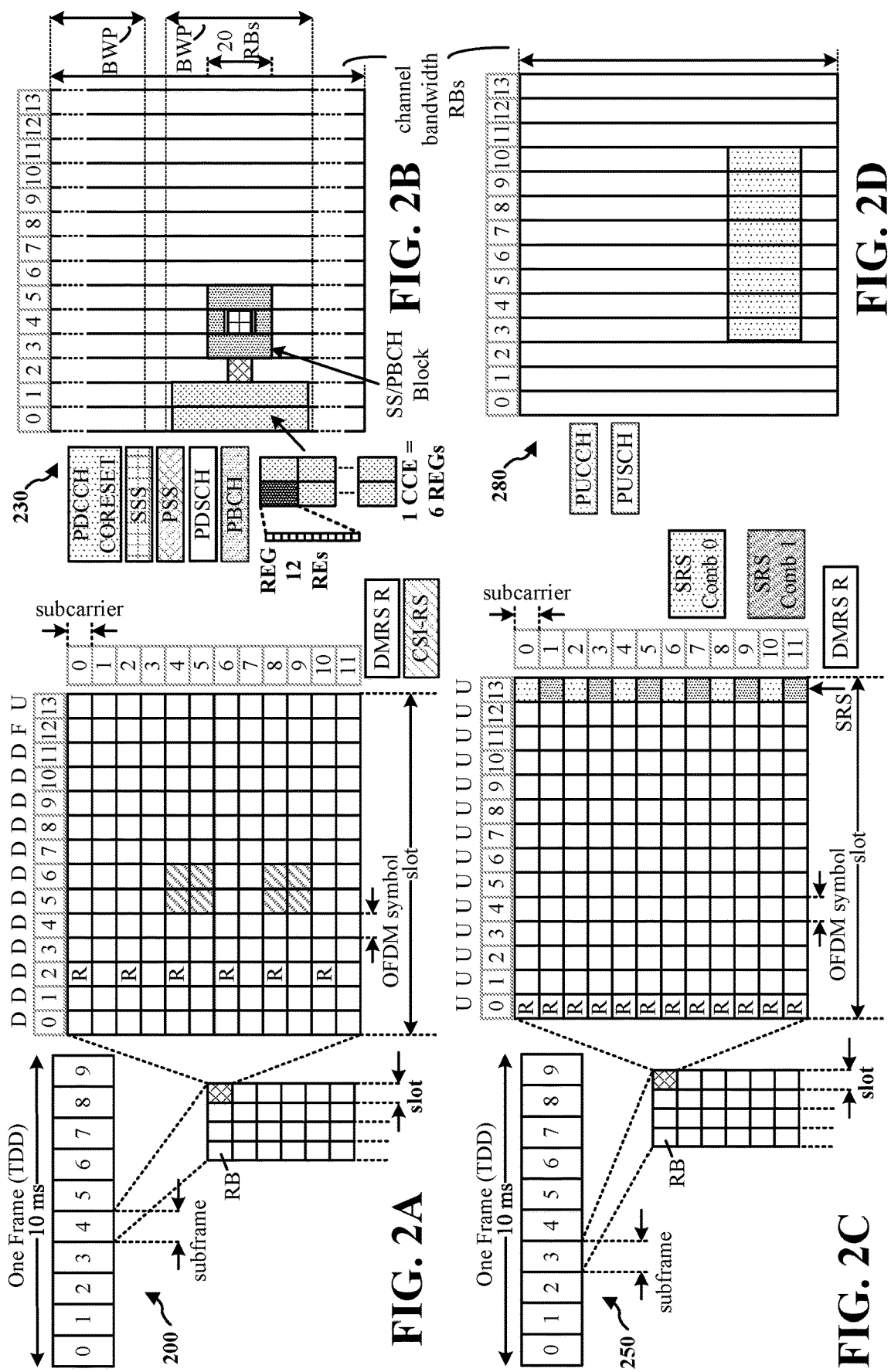
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
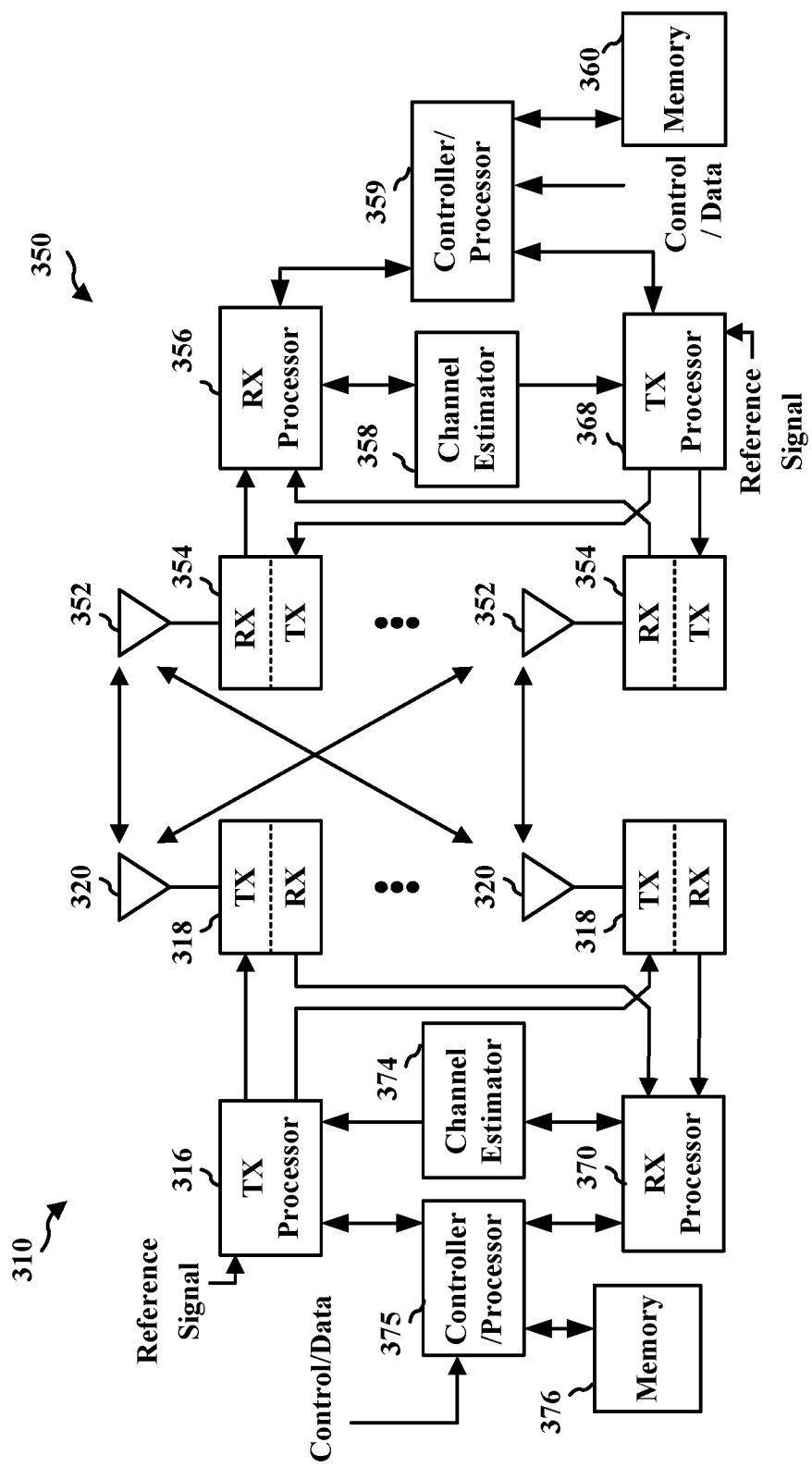
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. At least one of the TX processor 368, the RX processor 356, and the controller/processor 359 may be configured to perform aspects in connection with 198 and 199 of FIG. 1.

SL communication resource allocation in some aspects of wireless communications (e.g., 5G NR) may not be centrally controlled. Instead, each UE may autonomously select resources for particular communications based on information available to the UE and/or based on negotiation with other UEs. For example, some aspects perform inter-UE coordination in a certain mode (e.g., Mode 2) based on a set of resources in frequency and time (e.g., subcarriers, symbols, resource blocks (RBs), REs, etc.) sent by a first UE (e.g., UE-A) to a second UE (e.g., UE-B). In some aspects, inter-UE coordination includes the first UE (UE-A) sending, to the second UE (UE-B), (1) a set of resources favored or specified for the second UE's transmission and (2) a set of resources not favored for the second UE's transmission.

SL transmissions from different UEs may result in conflicting communications being received in a set of resources (e.g., a set of time and frequency resources defined by a time period and frequency range such as an RB, RE, etc.) at a receiving UE. Inter-UE coordination, in some aspects, may include sensing (or detecting) resources reserved or used by other UEs and transmitting information regarding the sensing (e.g., information identifying the resources reserved or used for transmissions by other UEs). The inter-UE coordination may also include detecting (e.g., identifying) conflicts between transmissions from different UEs and transmitting an indication of the detected conflicts to at least one of the UEs associated with the detected conflict. It may be beneficial to include details of the resource conflict. For example, it may be beneficial to identify the type of the resource conflict (e.g., high priority traffic conflict, recurring SPS conflicts, etc.). It may further be beneficial to specify a sensing operation for a first UE (UE-A) engaged in inter-UE coordination and to specify which type(s) of resource set information is (are) beneficial to particular cast type(s).

It may also be beneficial to specify (1) how a UE engaged in inter-UE coordination will determine a set of favored and not-favored resources, (2) when, and by which UE, the information regarding the favored and not-favored resources is sent, and (3) how to determine the UE pair to be engaged in inter-UE coordination. There may be further benefit by specifying (1) how a first UE engaged in inter-UE coordination transmits a determined set of (favored or not-favored) resources including a container used to carry the information (implicitly, explicitly, or both), (2) how a second UE receives the identified set of (favored or not-favored) resources and uses the information regarding the identified set of resources when performing resource selection for its own transmissions, and (3) how, or whether, to define the relationship between support/signalling of inter-UE coordination and cast type.

Figure 4:
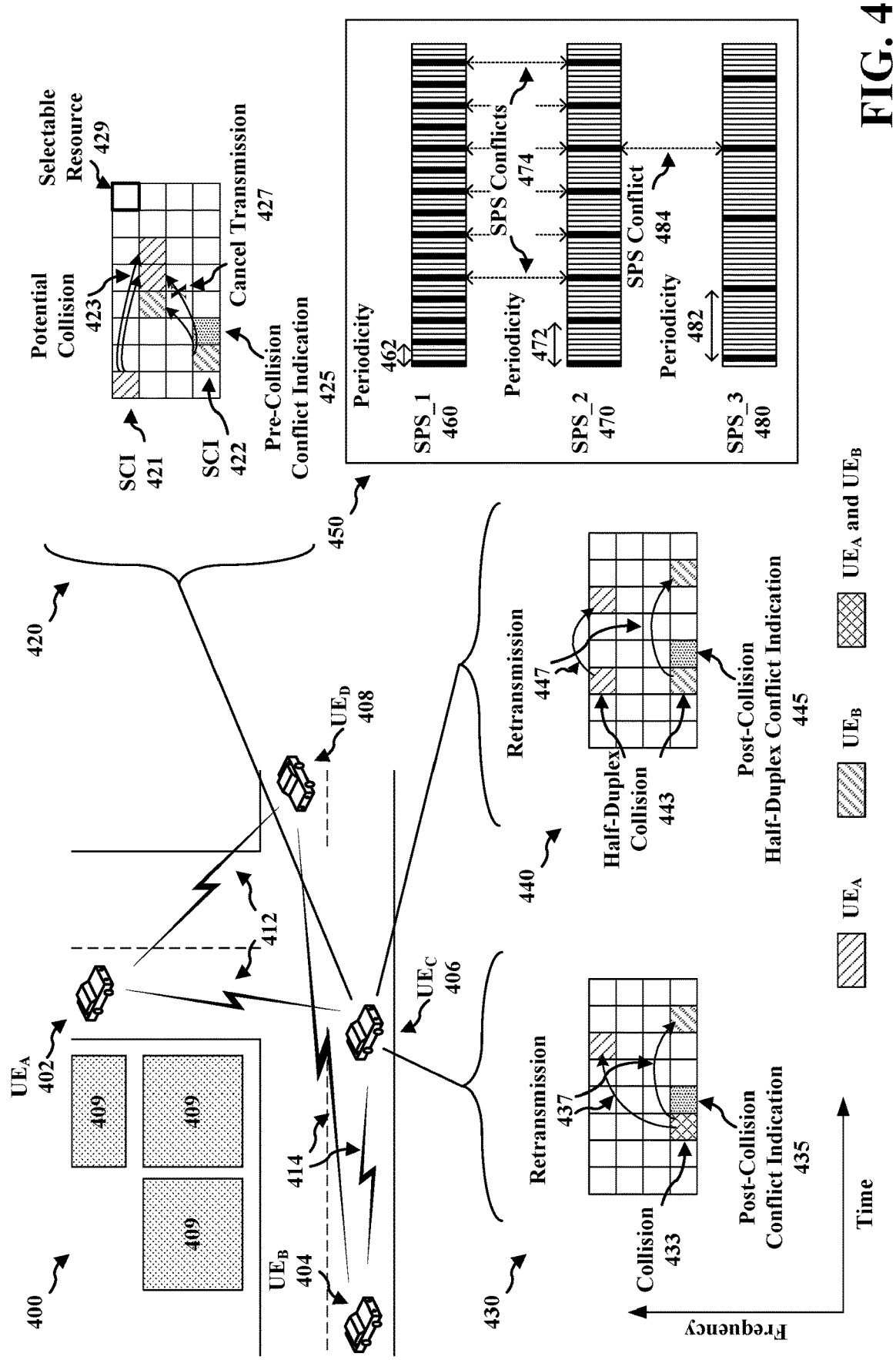
FIG. 4 includes a diagram illustrating an example of a set of UEs associated with a conflict between transmissions from different UEs.

FIG. 4 includes a diagram 400 illustrating an example of a set of UEs 402-406 associated with a conflict between transmissions from different UEs. Diagram 400 illustrates a set of UEs (vehicles $UE_A$-$UE_D$ 402-408) associated with a conflict between transmission of $UE_A$ 402 and $UE_B$ 404. In the example of diagram 400, direct communication between $UE_A$ 402 and $UE_B$ 404 is blocked by obstructions 409 (e.g., buildings) (e.g., $UE_A$ 402 is a hidden node for $UE_B$ 404 and $UE_B$ 404 is a hidden node for $UE_A$ 402). However, in the example of FIG. 4, $UE_A$ 402 and $UE_B$ 404 both transmit transmissions 412 and 414 that are received by $UE_C$ 406 and possibly $UE_D$ 408 and other UEs not shown. Additionally, $UE_C$ 406 may determine that the transmissions 412 and 414 of $UE_A$ 402 and $UE_B$ 404, respectively, are either relevant to at least one other UE (e.g., $UE_C$ 406, $UE_D$ 408, or other UEs within a certain distance) or to each other to determine that the conflict should be addressed.

Diagrams 420-440 illustrate examples of conflicting (colliding) transmissions 412 and 414 received from $UE_A$ 402 and $UE_B$ 404. Diagram 420 illustrates that $UE_C$ 406 may receive SL control information (SCI) 421 and 422 transmitted by $UE_A$ 402 and $UE_B$ 404, respectively. Each grid of diagrams 420-440 represents a resource grid. As illustrated each block is identified as a selectable resource 429 (e.g., time-and-frequency resources, a subchannel (e.g., an RB or some other grouping of resources)). The SCI 421 and 422 transmitted by $UE_A$ 402 and $UE_B$ 404, as shown, each include resource reservation information for two reserved time-and-frequency resources including a set of time-and-frequency resources overlapping in time and frequency (e.g., in the selectable resource identified as a potential collision 423). As will be discussed below in relation to diagram 440 a conflict between SL transmissions for UEs performing half-duplex communication may be based on resource reservation information for a set of time-and-frequency resources overlapping in time but not frequency that may be included in SCI transmitted by $UE_A$ 402 and $UE_B$ 404 (not shown).

Based on the SCI 421 and 422, $UE_C$ 406 may detect the potential collision 423 before $UE_A$ 402 and $UE_B$ 404 transmit the data in the overlapping set of time-and-frequency resources. As will be discussed below in relation to FIG. 8, the detection may include determining that the transmissions from $UE_A$ 402 and $UE_B$ 404 are configured to result in non-recurring conflicts. In this context "non-recurring" may refer to transmissions that are configured to not result in at least one of (1) a number of conflicts over a period of time that is above a threshold number of conflicts or (2) conflicts with a periodicity that is below a threshold periodicity (e.g., SCI 421 and 422 include per-packet scheduling information, or information regarding different SPS configurations used by $UE_A$ 402 and $UE_B$ 404 that have periodicities that do not sync with low enough periodicity). For example, diagram 450 includes 3 examples of SPS configurations SPS_1, SPS_2, and SPS_3 460-480 with 3 different periodicities 462, 472, and 482. Based on the different periodicities of the different SPS configurations 460-480, different numbers of SPS collisions 474 and 484 may be expected within a time period. The time period may be measured in seconds, milliseconds, microseconds, frames, slots, symbols, or any other measure of time selected in the future. As depicted SPS_1 460 and SPS_2 470 may experience a number of conflicts during a period of time that is above a threshold number of conflicts or experience conflict with a periodicity that is below a threshold. However, SPS_2 470 and SPS_3 480 may experience a number of conflicts during the same period of time that is below the threshold number of conflicts or experience conflict with a periodicity that is greater than the threshold.

As will be discussed below in relation to FIG. 8, the detection may also include measuring at least one of a reference signal received power (RSRP) for each of the transmissions 412 and 414 from $UE_A$ 402 and $UE_B$ 404, respectively, or measuring a reference signal received quality (RSRQ) for at least one of the transmissions 412 and 414 from $UE_A$ 402 and $UE_B$ 404. As will be discussed below in relation to FIG. 8, the detection may further include determining at least one of (1) that a difference between RSRPs measured for the transmissions from $UE_A$ 402 and $UE_B$ 404 is above a particular RSRP difference threshold (e.g., an absolute value or magnitude of an RSRP difference) applicable to non-recurring conflicts (i.e., that the signal strength of the two transmissions is too similar) or (2) that a measured RSRQ for at least one of the transmissions from $UE_A$ 402 and $UE_B$ 404 is below an RSRQ threshold applicable to non-recurring conflicts. For a first example, if $UE_C$ 406 measures RSRPs for transmissions 412 and 414 as −80 dBm and −83 dBm and an absolute RSRP difference threshold for non-recurring conflicts is 10 dB (representing approximately a ten-fold difference in signal strengths), the transmissions 412 and 414 would be determined to not be conflicting based on the absolute RSRP difference of 3 dB (representing approximately a two-fold difference). However, if $UE_C$ 406 measures RSRPs for transmissions 412 and 414 as −80 dBm and −93 dBm (i.e., an absolute RSRP difference of 10 dBm, representing an approximately twenty-fold difference in signal strength) and the absolute RSRP difference threshold for non-recurring conflicts is 10 dBm, the transmissions 412 and 414 would be determined to be conflicting. In some aspects, $UE_C$ 406 measures an RSRQ for at least one of transmissions 412 and 414 and applies an RSRQ threshold for non-recurring conflicts of 0.95 (representing a ratio of 0.95 between an RSRP for the reference signal for the measured transmission and a received signal strength indicator (RSSI) (a measure of total received wide-band power) measured at the UE) to determine whether the transmissions 412 and 414 conflict.

As will be further discussed below in relation to FIG. 8, in some aspects the detection may further include determining at least one of (1) that a difference between RSRPs measured for the transmissions from $UE_A$ 402 and $UE_B$ 404 is below a particular RSRP difference threshold (e.g., an absolute value or magnitude of an RSRP difference) applicable to non-recurring conflicts (i.e., that the signal strength of the two transmissions is too similar) or (2) that a measured RSRQ for at least one of the transmissions from $UE_A$ 402 and/or $UE_B$ 404 is below an RSRQ threshold applicable to non-recurring conflicts. For a second example, if $UE_C$ 406 measures RSRPs for transmissions 412 and 414 as −80 dBm and −83 dBm and an absolute RSRP difference threshold for non-recurring conflicts is 6 dB (representing approximately a four-fold difference in signal strengths), the transmissions 412 and 414 would be determined to be conflicting based on the absolute RSRP difference of 3 dB (representing approximately a two-fold difference). However, if $UE_C$ 406 measures RSRPs for transmissions 412 and 414 as −80 dBm and −90 dBm (i.e., an absolute RSRP difference of 10 dB, representing an approximately ten-fold difference in signal strength) and the absolute RSRP difference threshold for non-recurring conflicts is 6 dB, the transmissions 412 and 414 would be determined to not be conflicting. In some aspects, $UE_C$ 406 measures an RSRQ for at least one of transmissions 412 and/or 414 and applies an RSRQ threshold for non-recurring conflicts of 0.9 (representing a ratio of 0.9 between an RSRP for the reference signal for the measured transmission and an RSSI measured at the UE) to determine whether the transmissions 412 and 414 conflict.

Based on the detected potential conflict, $UE_C$ 406 may transmit, to at least one of $UE_A$ 402 and/or $UE_B$ 404, a pre-collision conflict indication 425. The pre-collision conflict indication 425 may be transmitted to $UE_B$ 404 and may include information regarding the resources reserved by $UE_A$ 402 (e.g., the reserved resources or at least the overlapping resources). $UE_B$ 404 may receive the pre-collision conflict indication 425 and determine to cancel the transmission 427 in the set of time-and-frequency resources overlapping with the transmission from $UE_A$ 402 (e.g., in the time-and-frequency resource identified as a potential collision 423). The data meant to be transmitted during the set of overlapping time-and-frequency resource may then be transmitted based on per-packet scheduling.

Diagram 430 illustrates that $UE_C$ 406 may receive conflicting (colliding) transmissions at a time-and-frequency resource identified as including a collision 433. Based on receiving the conflicting (colliding) transmissions, $UE_C$ 406 may transmit a post-collision conflict indication 435. The post-collision conflict indication 435 may be transmitted to $UE_A$ 402 and $UE_B$ 404 and may include information indicating that at least one of (1) RSRPs measured at $UE_C$ 406 or (2) at least one RSRQ measured at $UE_C$ 406 indicate a conflict between the transmissions 412 and 414. $UE_A$ 402 and $UE_B$ 404 may receive the post-collision conflict indication 435 and determine to re-transmit 437 the colliding transmissions. Since the re-transmission resource is selected by each of $UE_A$ 402 and $UE_B$ 404 based on different information or input (e.g., a randomly generated value, or a UE-specific value) it is unlikely for there to be a subsequent collision, but in the event that a collision occurs on the re-transmission, the same process may be repeated.

Diagram 440 illustrates that $UE_C$ 406 may receive conflicting (colliding) transmissions at different time-and-frequency resources at a same time, the conflicting resources identified as including a half-duplex collision 443. The conflict illustrated in diagram 440 is based on an overlap in transmission time that prevents $UE_A$ 402 and $UE_B$ 404 from receiving the transmission from $UE_B$ 404 and $UE_A$ 402, respectively (e.g., because they are operating in a half-duplex mode). Based on receiving the transmissions with the half-duplex collision 443, $UE_C$ 406 may transmit a post-collision half-duplex conflict indication 445. The post-collision half-duplex conflict indication 445 may be transmitted to $UE_A$ 402 and $UE_B$ 404 and may include information indicating that UE A and UE B cannot receive data from each other. $UE_A$ 402 and $UE_B$ 404 may receive the post-collision half-duplex conflict indication 445 and determine to re-transmit 447 the colliding transmissions. Since the re-transmission resource is selected by each of $UE_A$ 402 and $UE_B$ 404 based on different information or input (e.g., a randomly generated value, or a UE-specific value) it is unlikely for there to be a subsequent collision, but in the event that a collision occurs on the re-transmission, the same process may be repeated.

Figure 5:
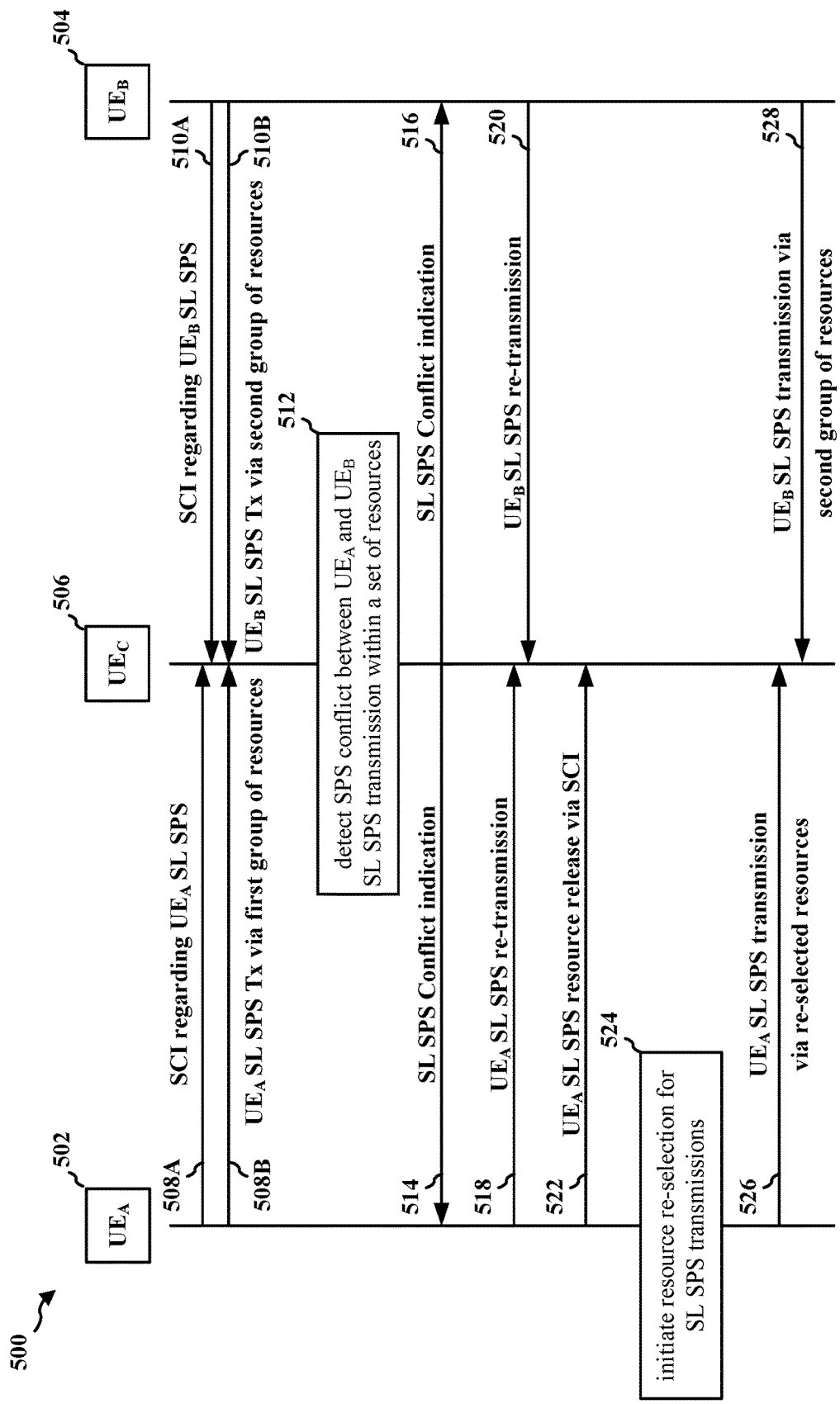
FIG. 5 illustrates a first UE and second UE in communication with a third UE.
Figure 6:
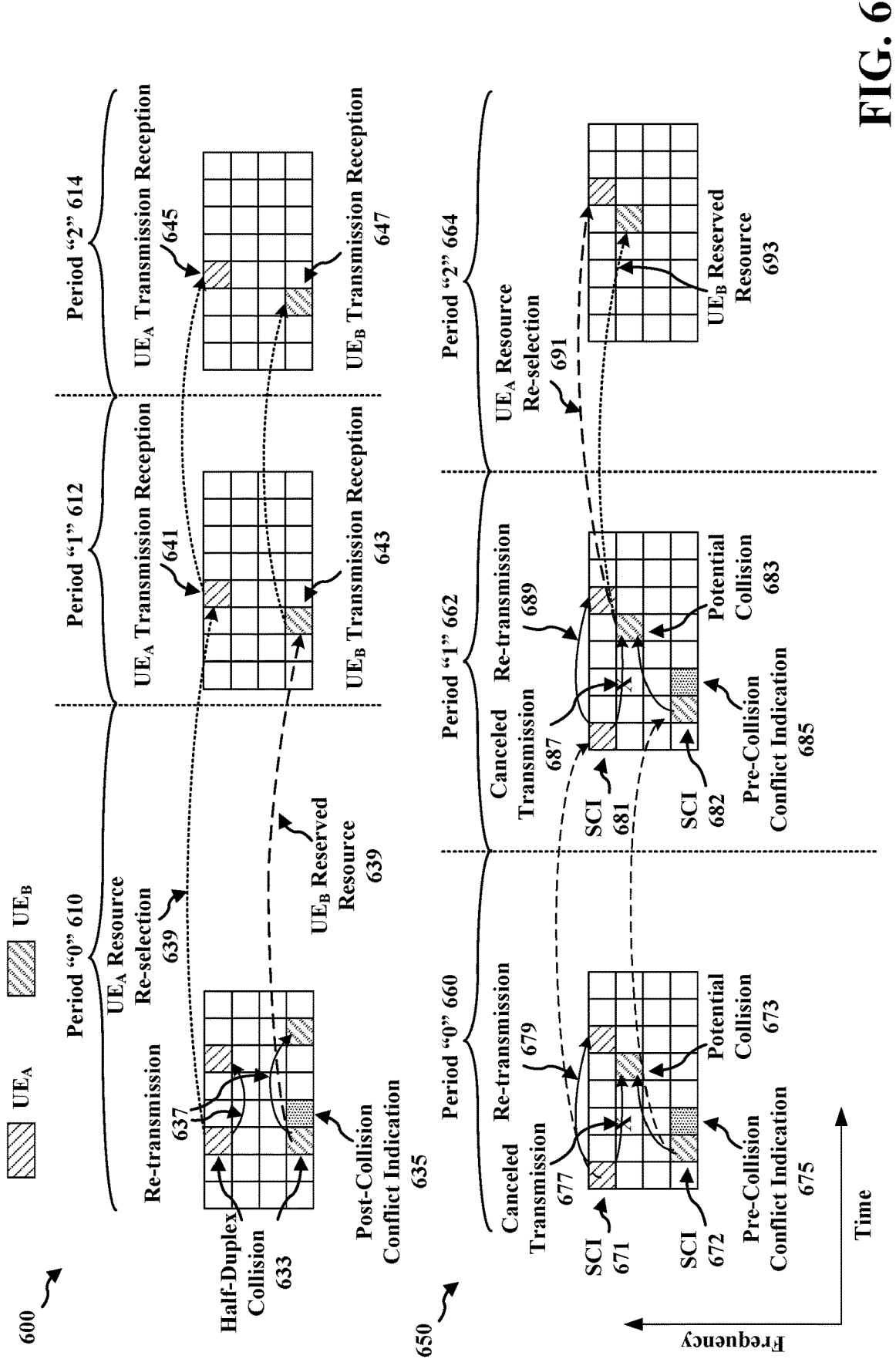
FIG. 6 includes diagrams illustrating conflict detection and handling for SL SPS transmissions received from first and second UEs at a third UE.

Beyond the benefits for generally detecting and handling conflicts in SL transmissions, additional benefits may be realized by specifically detecting and handling conflicts between SL transmissions based on SPS configurations which have increased potential for causing recurring conflicts. FIG. 5 is a call flow diagram 500 illustrating a method of wireless communication that addresses conflicts between SL transmissions based on SPS configurations (sometimes referred to below as SL SPS transmissions). FIG. 5 illustrates a first UE ($UE_A$ 502) and second UE ($UE_B$ 504) transmitting signals received by at least a third UE ($UE_C$ 506) (and possibly by other UEs in communication with at least one of $UE_A$ 502 and/or $UE_B$ 504). $UE_A$-$UE_C$ 502-506, in some aspects, may correspond to, or be deployed similarly to, $UE_A$-$UE_C$ 402-406 such that communications from $UE_A$ 502 to $UE_B$ 504 (and from $UE_B$ 504 to $UE_A$ 502) are blocked by obstructions (e.g., obstructions 409 of FIG. 4). FIG. 6 includes diagrams 600 and 650 illustrating conflict detection and handling for SL SPS transmissions received from first and second UEs ($UE_A$ and $UE_B$) at a third UE (e.g., $UE_C$).

Call flow diagram 500 illustrates that $UE_A$ 502 transmits one of (1) SCI 508A including information regarding SL SPS transmissions from $UE_A$ 502 (e.g., a set of SL transmissions based on a first activated SPS configuration) and (2) an SL SPS transmission 508B via time-and-frequency resources associated with a first activated SPS configuration that is received at $UE_C$ 506 (among other UEs in the vicinity such as $UE_D$ 408 of FIG. 4). Similarly, call flow diagram 500 illustrates that $UE_B$ 504 transmits one of (1) SCI 510A including information regarding SL SPS transmissions from $UE_B$ 504 (e.g., a set of SL transmissions based on a second activated SPS configuration) and (2) an SL SPS transmission 510B via resources associated with a second activated SPS configuration that is received at $UE_C$ 506 (among other UEs in the vicinity such as $UE_D$ 408 of FIG. 4). For example, referring to FIG. 6, during a first period, period "0" 660, $UE_A$ 502 and $UE_B$ 504 may transmit, and $UE_C$ 506 may receive, SCI 508A and 510A including information that indicates a possible conflict between SL SPS transmissions from $UE_A$ 502 and $UE_B$ 504. As a further example, referring to FIG. 6, during a first period, period "0" 610, $UE_A$ 502 and $UE_B$ 504 may transmit, and $UE_C$ 506 may receive, conflicting-in-time SL SPS transmissions 508B and 510B at a set of resources identified by half-duplex collision 633.

$UE_C$ 506 may receive the transmissions of SCI 508A and 510A at different times because while the SCI 508A and 510A may indicate a potential conflict, the potential conflict is not based on a conflict between the SCI 508A and 510A, but is instead based on the content of the SCI. For example, referring to FIG. 6, during period "0" 660, $UE_C$ 506 may receive SCI 671 and 672 (corresponding to SCI 508A and 510A) at resources that do not overlap in time. $UE_C$ 506 may receive the SL SPS transmissions 508B and 510B at a same time because the detected conflict is based on the resources of the SL SPS transmissions 508B and 510B overlapping during a particular time period. As described above in relation to FIG. 4, the resources of the SL SPS transmissions 508B and 510B may also overlap in frequency resources. For example, referring to FIG. 6, transmissions $UE_A$ 502 and $UE_B$ 504 may transmit, and $UE_C$ 506 may receive, transmissions 508B and 510B at a same time as in the resources identified as half-duplex collision 633 period "0" 610 via different frequencies or at a same time and via a same frequency as in the resource identified as potential collision 673 during period "0" 660.

Based on receiving at least one of (1) the transmissions of SCI 508A and 510A or (2) the SL SPS transmissions 508B and 510B, $UE_C$ 506 may detect 512 an SPS conflict in a set of time-and-frequency resources between SL SPS transmissions. As will be discussed below in relation to FIG. 8, the detection may include determining that the SL SPS transmissions from $UE_A$ 502 and $UE_B$ 504 (e.g., SL SPS transmissions 508B and 510B or other SL SPS transmissions scheduled in SCI 508A and 510A) are configured to be recurring. In this context "recurring" may refer to transmissions that are configured to result in at least one of (1) a number of conflicts over a period of time that is above a threshold number of conflicts or (2) conflicts with a periodicity that is below a threshold periodicity. In some aspects, "recurring" may refer specifically to transmissions that are configured to result in a number of conflicts over a period of time that is above a threshold number of conflicts. For example, SCI 508A and 510A may include SPS configuration information regarding SPS configurations used for SL SPS transmissions by $UE_A$ 502 and $UE_B$ 504 that have periodicities that result in conflicting transmission occasions of the SPS configurations occurring with a period that is below a threshold. Such recurring conflicts may occur when a first SPS configuration periodicity associated with SL SPS transmissions by one UE (e.g., either $UE_A$ 502 or $UE_B$ 504) is a multiple of a second SPS configuration periodicity associated with SL SPS transmissions by the other UE ($UE_B$ 504 or $UE_A$ 502) (e.g., one UE transmitting based on SPS configuration SPS_2 470 with periodicity 8 (e.g., measured in slots, frames, milliseconds, etc.) and the other UE transmitting based on SPS configuration SPS_1 460 with periodicity 4 (e.g., measured in slots, frames, milliseconds, etc.).

As will be discussed below in relation to FIG. 8, the detection may also include measuring at least one of an RSRP for each of the SL SPS transmissions from $UE_A$ 502 and $UE_B$ 504 or measuring a RSRQ for at least one of the SL SPS transmissions from $UE_A$ 502 and $UE_B$ 504. As will be discussed below in relation to FIG. 8, the detection may further include determining at least one of (1) that a difference between RSRPs measured for the SL SPS transmissions from $UE_A$ 502 and $UE_B$ 504 is above a particular RSRP difference threshold (e.g., an absolute value or magnitude of an RSRP difference) applicable to recurring conflicts or (2) that a measured RSRQ for at least one of the transmissions from $UE_A$ 502 and/or $UE_B$ 504 is below an RSRQ threshold applicable to recurring conflicts. For a first example, if $UE_C$ 506 measures RSRPs for transmissions 508A/B and 510A/B as −80 dBm and −83 dBm (an absolute RSRP difference of 3 dB, representing approximately a two-fold difference between the signal strengths) and an absolute RSRP difference threshold for recurring conflicts is 6 dB (i.e., an absolute RSRP difference threshold representing an approximately four-fold difference in signal strength, compared to the first example absolute RSRP threshold representing an approximately ten-fold difference applied to non-recurring conflicts discussed in relation to FIG. 4), the transmissions 508A/B and 510A/B would be determined to not be conflicting. However, if $UE_C$ 506 measures RSRPs for transmissions 508A/B and 510A/B as −80 dBm and −96 dBm (an absolute RSRP difference of 16 dB, representing approximately a forty-fold difference between the signal strengths) and the absolute RSRP difference threshold for recurring conflicts is 6 dB, the transmissions 508A/B and 510A/B would be determined to be conflicting. In some aspects, $UE_C$ 506 measures an RSRQ for at least one of transmissions 508A/B and/or 510A/B and applies an RSRQ threshold for recurring conflicts of 0.9 (representing a ratio of 0.9 between an RSRP for the reference signal for the measured transmission and an RSSI measured at the UE, contrasted to the first example RSRQ threshold of 0.95 applied to non-recurring conflicts discussed in relation to FIG. 4) to determine whether the transmissions 508A/B and 510A/B conflict.

As will be further discussed below in relation to FIG. 8, the detection may further include determining at least one of (1) that a difference between RSRPs measured for the SL SPS transmissions from $UE_A$ 502 and $UE_B$ 504 is below a particular RSRP difference threshold (e.g., an absolute value or magnitude of an RSRP difference) applicable to recurring conflicts or (2) that a measured RSRQ for at least one of the transmissions from $UE_A$ 502 and/or $UE_B$ 504 is below an RSRQ threshold applicable to recurring conflicts. For a second example, if $UE_C$ 506 measures RSRPs for transmissions 508A/B and 510A/B as −80 dBm and −83 dBm (an absolute RSRP difference of 3 dB, representing approximately a two-fold difference between the signal strengths) and an absolute RSRP difference threshold for recurring conflicts is 10 dB (i.e., an absolute RSRP difference threshold representing an approximately ten-fold difference in signal strength, compared to the second example absolute RSRP threshold representing an approximately four-fold difference applied to non-recurring conflicts discussed in relation to FIG. 4), the transmissions 508A/B and 510A/B would be determined to be conflicting. However, if $UE_C$ 506 measures RSRPs for transmissions 508A/B and 510A/B as −80 dBm and −96 dBm (an absolute RSRP difference of 16 dB, representing approximately a forty-fold difference between the signal strengths) and the absolute RSRP difference threshold for recurring conflicts is 10 dB, the transmissions 508A/B and 510A/B would be determined to not be conflicting. In some aspects, $UE_C$ 506 measures an RSRQ for at least one of transmissions 508A/B and/or 510A/B and applies an RSRQ threshold for recurring conflicts of 0.95 (representing a ratio of 0.95 between an RSRP for the reference signal for the measured transmission and an RSSI measured at the UE, contrasted to the second example RSRQ threshold of 0.9 applied to non-recurring conflicts discussed in relation to FIG. 4) to determine whether the transmissions 508A/B and 510A/B conflict.

The RSRP difference threshold (or RSRQ threshold) applicable to recurring conflicts may be lower, e.g., as described in the first example of FIG. 5 (i.e., 6 dB, (or 0.9)), than the RSRP difference threshold (or RSRQ threshold) applicable to non-recurring conflicts, e.g., as described in the first example of FIG. 4 (i.e., 10 dB, (or 0.95)). In some aspects, the RSRP difference threshold (or RSRQ threshold) applicable to recurring conflicts may be higher, e.g., as described in the second example of FIG. 5 (i.e., 10 dB, (or 0.95)), than the RSRP difference threshold (or RSRQ threshold) applicable to non-recurring conflicts, e.g., as described in the second example of FIG. 4 (i.e., 6 dB, (or 0.9)). A lower RSRP threshold difference (e.g., specifying that one transmission's RS be significantly more powerful) may indicate that a measured RSRP difference can be smaller between the SL SPS transmissions resulting in recurring conflicts than the RSRP difference for SL SPS transmissions or per-packet transmissions that do not result in recurring conflicts. This is because, even with a lower interference level, recurring collisions have a much longer lasting effect on system performance than a one-off collision with stronger level of interference.

Applying different RSRP difference (or RSRQ) thresholds may avoid unnecessary resource re-selection based on the detection of short term (one-off or infrequent) conflicts. For conflicts that do not meet the threshold specification, standard per-packet re-transmission procedures can be employed without affecting the resource allocation generally for an SL network including the communicating UEs (e.g., $UE_A$-$UE_C$ 502-506). Thus, applying the different thresholds may lead to a more stable resource allocation for the SL network because less serious conflicts (non-recurring conflicts) are less likely to lead to resource re-selection. In contrast, if the more sensitive threshold is applied to all conflicts, one-off conflicts could lead to a resource re-selection operation that could, in turn, create another conflict that could lead to another resource re-selection operation, creating an ever-shifting landscape of reserved resources (e.g., based on a chain reaction of resource re-selections creating new conflicts that specify new resource re-selections, etc.). By applying the less sensitive threshold to non-recurring conflicts there is a damping effect by having conflict events that do not trigger resource re-selection operations interrupting a chain reaction.

Upon detecting the at least one SPS conflict, $UE_C$ 506 may transmit an indication of the SPS conflict to at least one of $UE_A$ 502 and/or $UE_B$ 504. For example, referring to FIG. 6, $UE_C$ 506 may detect a half-duplex collision 633 between SL SPS transmissions 508B and 510B during period "0" 610 and $UE_C$ 506 may transmit a post-collision conflict indication 635 to at least one of $UE_A$ 502 or $UE_B$ 504. Additionally, $UE_C$ 506 may detect a potential collision from SCI 671 and 672 (or SCI 681 and 682) between SL SPS transmissions from $UE_A$ 502 and $UE_B$ 504 during period "0" 660 (or during period "1" 662) and $UE_C$ 506 may transmit a pre-collision conflict indication 675 (or pre-collision conflict indication 685) to at least one of $UE_A$ 502 or $UE_B$ 504. As shown, diagram 500 assumes that $UE_C$ 506 transmits the indication of the SL SPS conflict 514 to $UE_A$ 502 and may transmit the indication of the SL SPS conflict 516 to $UE_B$ 504. The indication of the SL SPS conflict 514/516 may include information regarding the detected at least one SL SPS conflict between the first SL SPS transmission (e.g., SPS 510A) and the second SL transmission (e.g., SL SPS transmission 510B). The transmission of the indication of the SL SPS conflict 514/516 may be transmitted via one of a medium access control (MAC) control element (MAC-CE), sidelink control information (SCI), or a physical sidelink feedback channel (PSFCH).

The different transmission options, in some aspects, have benefits and drawbacks. For example, using a MAC-CE has the benefit of flexible signaling design that may explicitly indicate the colliding resource(s) along with other information (e.g., position information that may be used to determine if UEs transmitting conflicting signals should be in communication). On the other hand, using a MAC-CE may result in duplicated notifications from different UEs, may consume more resources to convey the information, and may have lower reliability. Alternatively, using SCI (e.g., SCI-2) may result in a single frequency network (SFN) effect (multiple UEs transmitting a same data in a same set of time and frequency resources) that improves the reliability of the transmissions. However, using SCI may still consume a lot of resources and a resource mapping (e.g., an implicit resource mapping) may be specified to achieve the SFN effects. The resource mapping may map a conflict in a specific resource(s) to a specific resource(s) in which SCI including the indication of the SL SPS conflict should be transmitted to have each UE that transmits the indication of the SL SPS conflict experience positive interference that leads to a stronger signal. Alternatively, using PSFCH (or a PSFCH-like sequence) may result in the SFN effects and has high reliability with low resource consumption. However, using PSFCH may also specify a resource mapping to achieve the SFN effects as for SCI and may provide more limited information.

Based on the indication of the SL SPS conflict 514, $UE_A$ 502 may re-transmit 518 the conflicted transmission in a current period. Similarly, $UE_B$ 504 may also re-transmit 520 the conflicted transmission during the current period based on the indication of the SL SPS conflict 516. For example, referring to diagram 600 of FIG. 6, $UE_C$ 506 may detect the half-duplex collision 633 and may transmit post-collision conflict indication 635 (corresponding to the indications of the SL SPS conflict 514 and/or 516). $UE_A$ 502 and $UE_B$ 504 may perform re-transmission 637 (corresponding to re-transmissions 518 and 520). Alternatively, for pre-collision indication of SL SPS conflict, $UE_A$ 502 may refrain from transmitting during the resource in which the conflict is indicated and may instead select a resource for re-transmission 518 leaving the transmission from $UE_B$ 504 unconflicted with no conflict-based re-transmission. As illustrated in diagram 650 of FIG. 6, if the potential SL SPS conflict (potential collisions 673 or 683) is detected based on SCI 671/672 (or SCI 681/682) corresponding to SCI 508A/508B, $UE_A$ 502 may refrain from transmitting during the conflicted resources as indicated by the canceled transmission 677 (or canceled transmission 687) and instead determine a re-transmission resource for re-transmission 679 (or re-transmission 689).

In some aspects, $UE_A$ 502 may transmit a release 522 of the resources associated with the SL SPS transmitted by $UE_A$ 502 for which a conflict was detected. The release 522 of the SL SPS resources may be transmitted via SCI in a period after the indication of the SL SPS conflict. For example, referring to FIG. 6, during period "1" 662, $UE_A$ 502 may transmit SCI 681 including resource release information corresponding to release 522 of resources. Again, referring to FIG. 6, as $UE_B$ 504 may not need to release resources, SCI 682 may or may not be transmitted. The release 522, in some aspects, indicates that a reservation period for at least the resources for which the conflict was detected will be released after a next SL SPS transmission during a current period (e.g., that a reservation period for the SL SPS transmission is set to zero). For example, referring to FIG. 6, during period "1" 662, $UE_A$ 502 may transmit SCI 681 including resource release information for resources during period "2" 664. By waiting to perform a resource re-selection until after the resources for which the conflict was detected are released 522, the method may reduce the violation of SPS reservations related to the SL SPS transmissions transmitted by $UE_A$ 502.

After re-transmitting 518 the conflicted transmission, and releasing 522 the SL SPS resources, $UE_A$ 502 may initiate (or trigger) 524 resource re-selection for the SL SPS transmissions. For example, referring to FIG. 6, between period "0" 610 and period "1" 662, $UE_A$ 502 may initiate (or trigger) 524 a resource re-selection 639 to select a different resource for transmitting SL SPS transmissions during at least period "1" 612 and period "2" 614 (and additional SPS transmission occasions). For aspects that perform the resource release, $UE_A$ 502 may initiate (or trigger) 524 a resource re-selection 691 between period "1" 662 and period "2" 664 after a release 522 transmitted in SCI 681. The resource re-selection may be initiated 524 differently for different types of traffic or conflicts. For example, as described above, initiating (or triggering) 524 the resource re-selection for the SL SPS transmissions may occur after a release 522 of resources based on a detected possible conflict of traffic that is not high priority. Additionally, for high priority traffic, the resource re-selection may be initiated 524 for a next period without releasing 522 resources associated with the SL SPS transmissions, accepting a resource reservation violation to avoid additional conflicts for the high priority traffic. After resource re-selection is complete, $UE_A$ 502 may transmit an SL SPS transmission 526 via the re-selected resources, and $UE_B$ 504 may transmit an SL SPS transmission 528 via the second set of resources used for the transmission of SL SPS transmission 510B. For example, referring to FIG. 6, after the resource re-selection $UE_A$ 502 may transmit SL SPS transmissions via the resources identified in diagram 600 by $UE_A$ transmission reception 641 and 645 or via the resource identified in diagram 650 by resource re-selection 691 for $UE_A$ while $UE_B$ 504 continues to use the resource identified in diagrams 600 as $UE_B$ transmission reception 643 and 647 and identified in diagram 650 as the resource with the potential collision 673 (and 683) and as $UE_B$ reserved resource 693.

Figure 7:
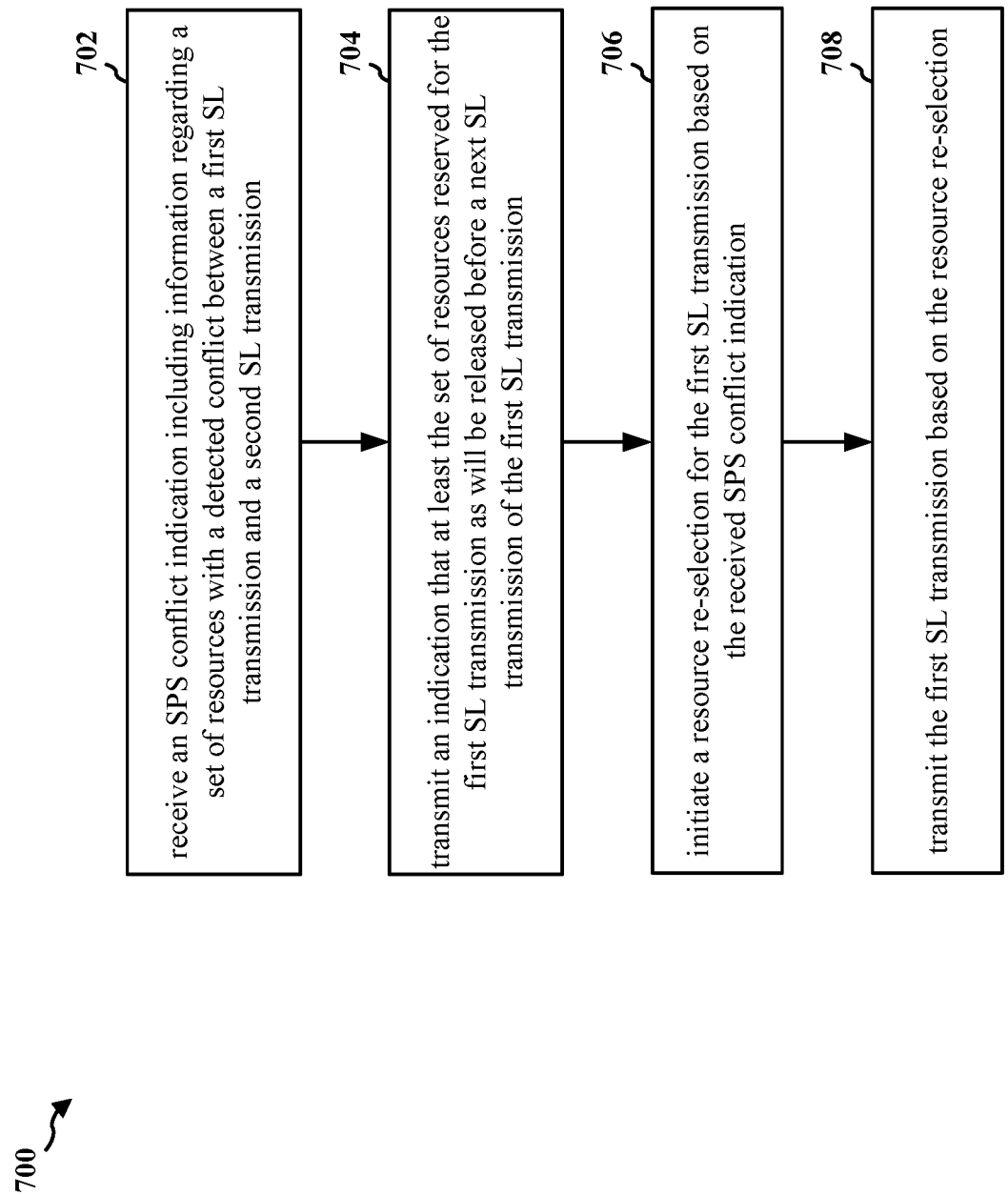
FIG. 7 is a flowchart of a method of wireless communication.

FIG. 7 is a flowchart 700 of a method of wireless communication. The method may be performed by a first UE (e.g., the UE 104; $UE_A$ 402/502; the apparatus 902). At 702, the first UE may receive, from a third UE, an indication of an SL SPS conflict, the indication of the SL SPS conflict may include information regarding a set resources (e.g., time-and-frequency resources) with at least one conflict between a first SL SPS transmission and a second SL SPS transmission, where the first SL SPS transmission is associated with the first UE and the second SL SPS transmission is associated with a second UE. For example, 702 may be performed by SL SPS conflict indication reception component 942 of apparatus 902 of FIG. 9. For example, referring to FIGS. 4-6 and 9, $UE_A$ 402 or 502 (including the SL SPS conflict indication reception component 942) may receive an indication of an SL SPS conflict 514 from $UE_C$ 406/506. The indication of the SL SPS conflict 514 may include information regarding a set of resources (e.g., time-and-frequency resources) involved in a collision (e.g., time-and-frequency resources associated with potential collision 423, collision 433, half-duplex collision 633, or potential collision 673) between an SL SPS transmission (e.g., transmission 508B) associated with $UE_A$ 402/502 and an SL SPS transmission (e.g., transmission 510B) associated with $UE_B$ 404/504.

As discussed in relation to FIG. 8, the first UE (e.g., $UE_A$ 402/502) may receive the indication of the SL SPS conflict from the third UE ($UE_C$ 406/506) based on at least one of a difference between a first RSRP for the first SL SPS transmission and a second RSRP for the second SL SPS transmission that is above, or below, an RSRP difference threshold; or an RSRQ for at least one of the first SL SPS transmission or the second SL SPS transmission that is below an RSRQ threshold. As discussed in relation to FIG. 8, the first UE (e.g., $UE_A$ 402/502) may receive the indication of the SL SPS conflict from the third UE ($UE_C$ 406/506) via one of a MAC-CE, SCI, or a PSFCH. $UE_C$ 406/506 may transmit the indication of the SL SPS conflict at 810 of FIG. 8.

At 704, the first UE may transmit a second indication that at least the set of time-and-frequency resources reserved for the first SL SPS transmission associated with the first UE will be released before a next SL SPS transmission period of the first SL SPS transmission associated with the first UE. For example, 704 may be performed by SL SPS conflict resource re-selection component 944 of apparatus 902 of FIG. 9. For example, referring to FIGS. 4-6 and 9, $UE_A$ 402 or 502 (including the SL SPS conflict resource re-selection component 944) may transmit the second indication (e.g., release 522 of SL SPS resources via SCI 681) that at least the set of time-and-frequency resources reserved for the first SL SPS transmission associated with $UE_A$ 402 or 502 and the detected conflict (e.g., time-and-frequency resources associated with potential collision 423, collision 433, half-duplex collision 633, or potential collision 673/683) will be released before a next SL SPS transmission period (period "2" 664 of FIG. 6) of the first SL SPS transmission associated with $UE_A$ 402 or 502. A release of SL SPS reserved resources as described in relation to 704, may be used for SL SPS transmission conflicts between SL SPS transmissions that do not carry high-priority traffic such that a first and second SL SPS transmission occasion of the first SL SPS transmission may collide with first and second SL SPS transmissions of the second SL SPS transmission, in order to not violate a resource reservation for the second SL SPS transmission of the first SL SPS transmission.

At 706, the first UE may initiate (or trigger) a resource re-selection for the first SL SPS transmission based on the received indication of the SPS conflict. For example, 706 may be performed by SL SPS conflict resource re-selection component 944 of apparatus 902 of FIG. 9. For example, referring to FIGS. 4-6 and 9, $UE_A$ 402 or 502 (including the SL SPS conflict resource re-selection component 944) may initiate a resource re-selection 524 (or resource re-selection 639 or 691) for at least the set of time-and-frequency resources of the first SL SPS transmission that are the basis of the detected SL SPS conflict (e.g., time-and-frequency resources associated with half-duplex collision 633 or potential collisions 673 or 683). The resource re-selection may also include a resource re-selection for resources that do not contribute to the SL SPS conflict (e.g., the time-and-frequency resource following the time-and-frequency resource including the potential collision 423 or additional time-and-frequency resources including SL SPS transmissions for $UE_A$ 402/502 in FIG. 6 that are not identified because they do not collide with other SL SPS transmissions). The resource re-selection at 706 may be initiated immediately after detection of an SL SPS conflict 514 (e.g., post-collision conflict indication 635 during period "0" 610) in the absence of a resource release 522. Alternatively, the resource re-selection at 706 may be initiated after (1) detection of an SL SPS conflict 514 (e.g., pre-collision conflict indication 675 during period "0" 660) and (2) a release 522 of SL SPS resources (e.g., in SCI 681).

At 708, the first UE may transmit the first SL SPS transmission based on the resource re-selection. For example, 708 may be performed by SL SPS transmission component 946 of apparatus 902 of FIG. 9. For example, referring to FIGS. 4-6 and 9, $UE_A$ 402 or 502 (including the SL SPS transmission component 944) may transmit SL SPS transmission 526 (via resources indicated by $UE_A$ transmission receptions 641, 645, or indicated by the $UE_A$ resource re-selection 691) based on the resource re-selection 524 (or resource re-selection 639 or 691). The SL SPS transmission 526 based on the resource re-selection 524 may include a group of resources re-selected for previously-used resources for which the indication of the SL SPS was not received at 702.

Figure 8:
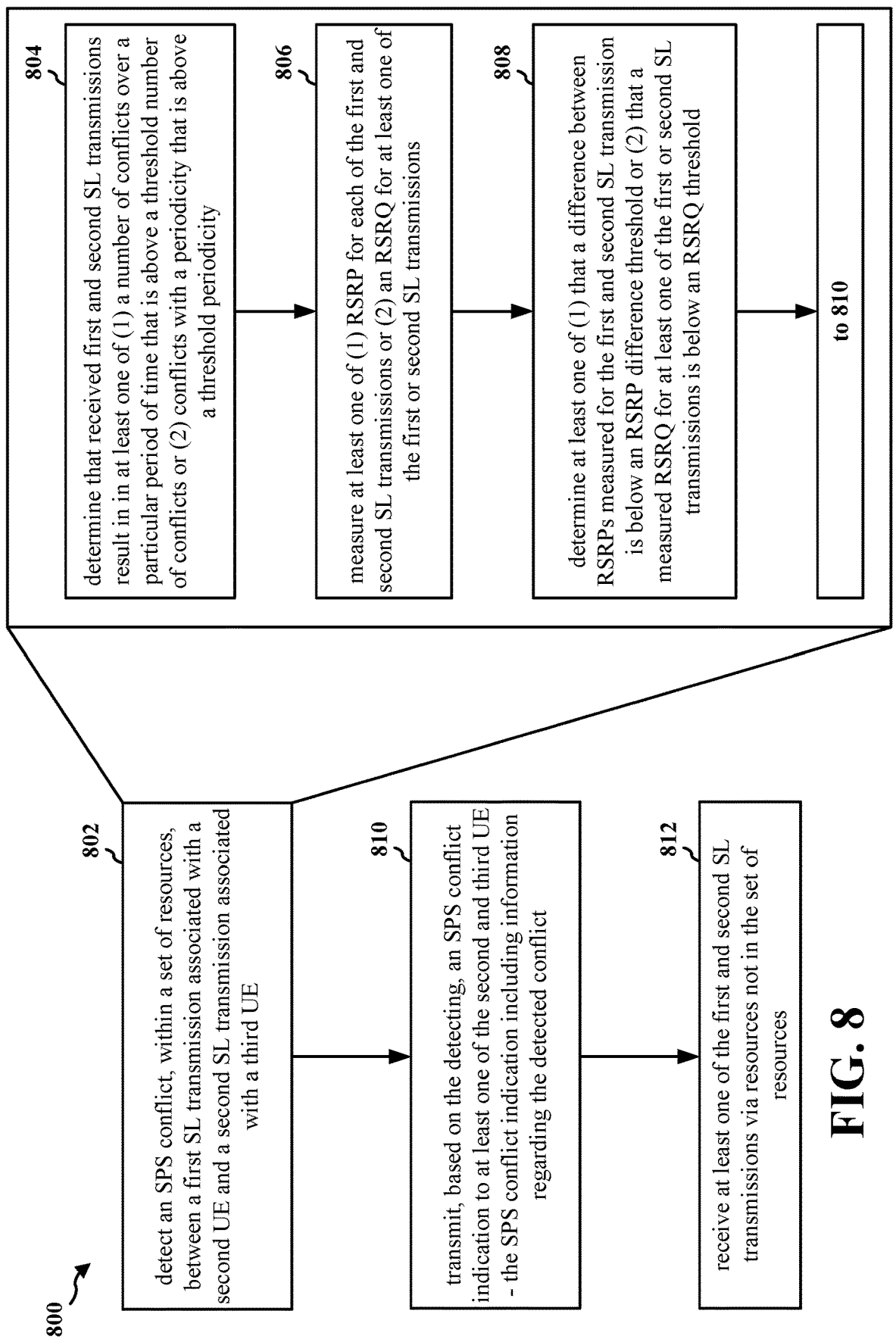
FIG. 8 is a flowchart of a method of wireless communication.

FIG. 8 is a flowchart 800 of a method of wireless communication. The method may be performed by a third UE (e.g., the UE 104; $UE_C$ 406/506; the apparatus 1002). At 802, the third UE may detect, in a set of time-and-frequency resources, at least one SPS conflict between a first SL SPS transmission and a second SL SPS transmission, where the first SL SPS transmission is associated with a first UE and the second SL SPS transmission is associated with a second UE. For example, 802 may be performed by SL SPS conflict detection component 1042 of FIG. 10. For example, referring to FIGS. 4-6 and 10, $UE_C$ 406 or 506 may detect 512 an SL SPS collision (e.g., potential collision 423, collision 433, half-duplex collision 633, or potential collision 673) between a first SL SPS transmission from $UE_A$ 402/502 and a second SL SPS transmission from $UE_B$ 404/504 in a set of time-and-frequency resources.

Detecting the at least one SPS conflict in the set of time-and-frequency resources, may include one or more of sub-steps 804-808 discussed below or other similar operations. At 804, the third UE may determine that the first SL SPS transmission and the second SL SPS transmission are configured to result in at least one of (1) a number of conflicts over a period of time that is above a threshold number of conflicts or (2) conflicts with a periodicity that is below a threshold periodicity. In some aspects, the third UE may determine that the first SL SPS transmission and the second SL SPS transmission are configured to result a number of conflicts over a period of time that is above a threshold number of conflicts. For example, 804 may be performed by SL SPS conflict detection component 1042 and more specifically by SL SPS conflict frequency detection component 1043 of FIG. 10. For example, referring to FIGS. 4-6 and 10, $UE_C$ 406 or 506 (including the SL SPS conflict detection component 1042) may receive SCI 508A/671 and 510A/672 indicating that $UE_A$ 402/502 has reserved resources based on SPS_1 460 of FIG. 4 and that $UE_B$ 404/504 has reserved resources based on SPS_2 470, respectively. From the SPS configuration for SPS_1 460 and SPS_2 470, $UE_C$ 406 or 506 may determine that the first SL SPS transmission and the second SL SPS transmission are configured to result in one of (1) a number of conflicts over a period of time that is above a threshold number of conflicts or (2) conflicts with a periodicity that is below a threshold periodicity.

At 806, the third UE may measure a respective RSRP for each of the first SL SPS transmission and the second SL SPS transmission. In some aspects, the third UE may measure an RSRQ for at least one of the first SL SPS transmission or the second SL SPS transmission. For example, 806 may be performed by SL SPS conflict detection component 1042 and more specifically by SL SPS signal strength measurement component 1044 of FIG. 10. For example, referring to FIGS. 4-6 and 10, $UE_C$ 406 or 506 (including the SL SPS conflict detection component 1042) may receive reference signals associated with $UE_A$ 402/502 and/or $UE_B$ 404/504 and perform an RSRP or RSRQ measurement.

At 808, the third UE may determine that a magnitude of a difference between the respective RSRPs is below an RSRP difference threshold in a set of RSRP difference thresholds. In some aspects, the third UE may determine that the at least one measured RSRQ is below an RSRQ threshold in a set of RSRQ thresholds. For example, 808 may be performed by SL SPS conflict detection component 1042 and more specifically by SL SPS signal strength thresholding component 1045 of FIG. 10. For example, referring to FIGS. 4-6 and 10, $UE_C$ 406 or 506 (including the SL SPS conflict detection component 1042) may compare the measured RSRPs of the reference signals associated with the first SL SPS transmission for $UE_A$ 402/502 and the second SL SPS transmission for $UE_B$ 404/504 and determine that the difference between the RSRPs is above or below an RSRP difference threshold (e.g., the absolute difference indicates a threshold level of interference between the first SL SPS transmission for $UE_A$ 402/502 and the second SL SPS transmission for $UE_B$ 404/504). Additionally, $UE_C$ 406 or 506 (including the SL SPS conflict detection component 1042) may compare a measured RSRQ of at least one of the reference signals associated with the first SL SPS transmission for $UE_A$ 402/502 or the second SL SPS transmission for $UE_B$ 404/504 to a RSRQ threshold and determine that RSRQ is below the RSRQ threshold (e.g., indicating that the SL SPS transmission for which the RSRQ was measured is experiencing interference above an acceptable level).

In some aspects, the set of RSRP difference thresholds includes a first RSRP difference threshold applied when a pair of SL transmissions is determined to be configured to result in a number of conflicts over the period of time that is above a threshold number of conflicts and a second RSRP difference threshold applied when the pair of SL transmissions is determined to not be configured to result in a number of conflicts over the period of time that is above the threshold number of conflicts. The first RSRP difference threshold, in some aspects, may be greater than the second RSRP difference threshold. In some aspects, the set of RSRQ thresholds includes a first RSRQ threshold applied when a pair of SL transmissions is determined to be configured to result in a number of conflicts over the period of time that is above the threshold number of conflicts and a second RSRQ threshold applied when the pair of SL transmissions is determined to not be configured to result in a number of conflicts over the period of time that is above the threshold number of conflicts. The first RSRQ threshold, in some aspects, may be greater than the second RSRQ threshold At 810, the third UE may transmit, upon detecting the at least one SPS conflict at 802, an indication of the SPS conflict to at least one of the first UE and/and the second UE, where the indication of the SPS conflict includes information regarding the detected at least one SPS conflict between the first SL SPS transmission and the second SL SPS transmission. For example, 810 may be performed by SL SPS conflict indication component 1046 of FIG. 10. For example, referring to FIGS. 4-6 and 10, $UE_C$ 406 or 506, upon detecting 512 an SL SPS conflict, may transmit an indication of SL SPS conflict 514 (and/or 516) to $UE_A$ 402/502 (and/or $UE_B$ 404/504). The indication of the SL SPS conflict 514 (and/or 516) may include information regarding the detected SL SPS conflict (e.g., information identifying the set of conflicting resources (e.g., time-and-frequency resources), an identity or location of the UE ($UE_B$ 404/504 and/or $UE_A$ 402/502) transmitting the conflicting transmission). The third UE, $UE_C$ 406/506, may transmit the indication of the SPS conflict via one of a MAC-CE, SCI, or a PSFCH.

At 812, the third UE (e.g., $UE_C$ 406/506), may receive at least one of the first SL SPS transmission (e.g., SL SPS transmission 526) and/or the second SL SPS transmission in time-and-frequency resources that are not in the set of time-and-frequency resources for which the conflict was detected based on the detecting and transmitting. For example, 812 may be performed by reception component 1030 of FIG. 10. For example, $UE_C$ 406/506 may receive an SL SPS transmission on the resource selected in the resource re-selection 691 that was not in the set of resources for which potential collision 673 was detected.

Figure 9:
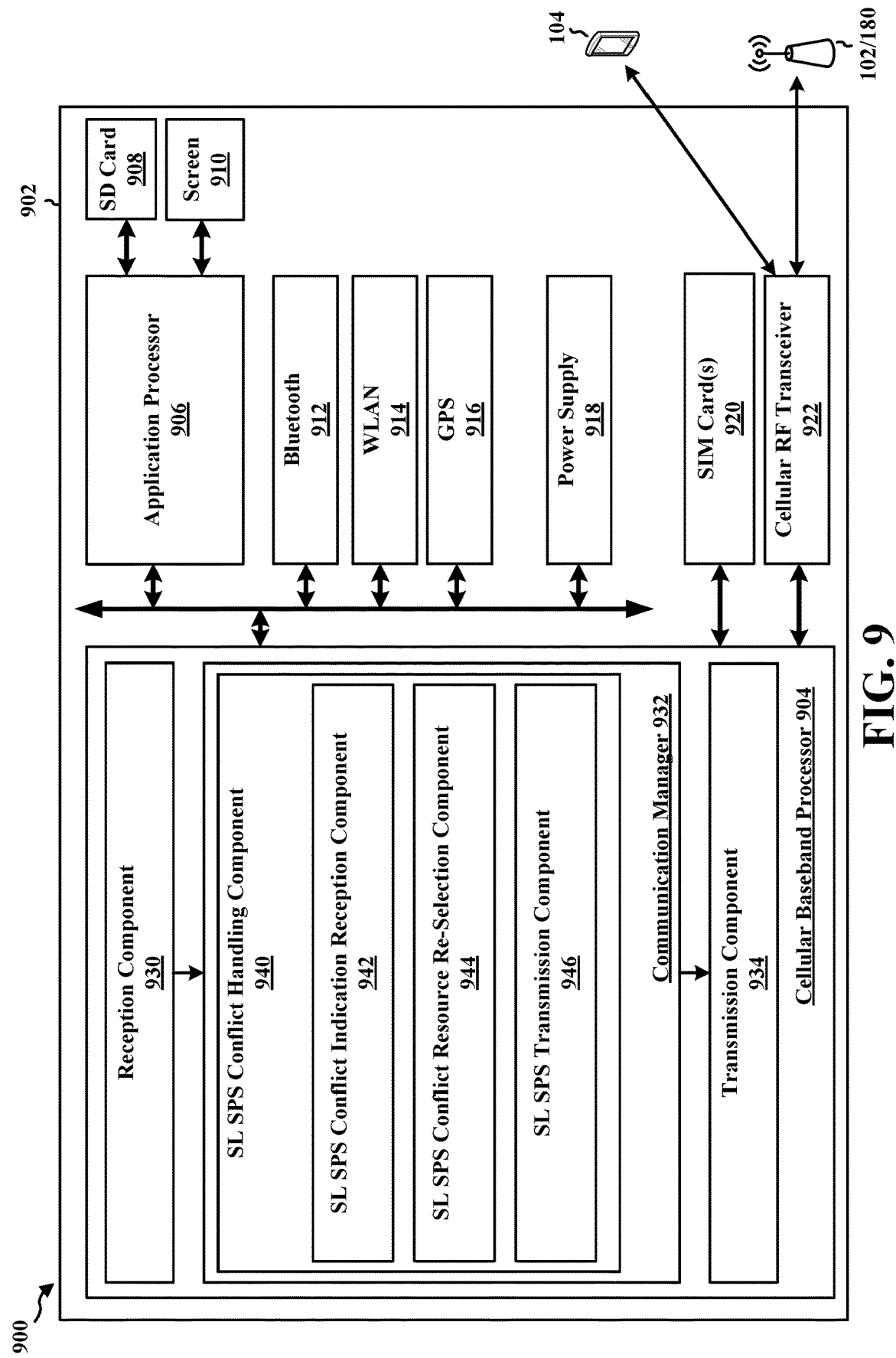
FIG. 9 is a diagram illustrating an example of a hardware implementation for an apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/ memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes an SL SPS conflict handling component 940 that is configured to receive, from a third UE, an indication of an SPS conflict, the indication of the SPS conflict including information regarding a set of time-and-frequency resources with at least one conflict between a first SL SPS transmission and a second SL SPS transmission, where the first SL SPS transmission is associated with the first UE and the second SL SPS transmission is associated with a second UE; initiate (or trigger) a resource re-selection for the first SL SPS transmission based on the received indication of the SPS conflict; and transmit the first SL SPS transmission based on the resource re-selection, e.g., as described in connection with operations 702, 706, and 708 of FIG. 7. The SL SPS conflict handling component 940 includes an SL SPS conflict indication reception component 942 that receives input in the form of an indication of an SL SPS conflict from the third UE and may be configured to process the SL SPS conflict indication, e.g., as described in connection with 702 of FIG. 7. The SL SPS conflict handling component 940 further includes an SL SPS conflict resource re-selection component 944 that receives input in the form of information regarding the resources involved in the indicated SL SPS conflict from the SL SPS conflict indication reception component 942 and is configured to initiate a resource re-selection operation, e.g., as described in connection with 706 of FIG. 7. The SL SPS conflict handling component 940 further includes an SL SPS transmission component 946 that receives input in the form of information regarding the resources selected by the resource re-selection from the SL SPS conflict resource re-selection component 944 and is configured to transmit the first SL SPS transmission based on the resource re-selection, e.g., as described in connection with 708 of FIG. 7.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, may include means for receiving, from a third UE, an indication of an SPS conflict, the indication of the SPS conflict including information regarding a set of time-and-frequency resources with at least one conflict between a first SL SPS transmission and a second SL SPS transmission, where the first SL SPS transmission is associated with the first UE and the second SL SPS transmission is associated with a second UE. The apparatus 902, and in particular the cellular baseband processor 904, may further include means for initiating (or triggering) a resource re-selection for the first SL SPS transmission based on the received indication of the SPS conflict. The apparatus 902, and in particular the cellular baseband processor 904, may further include means for transmitting the first SL SPS transmission based on the resource re-selection. The apparatus 902, and in particular the cellular baseband processor 904, may further include means for transmitting a second indication that at least the set of time-and-frequency resources reserved for the first SL SPS transmission associated with the first UE will be released before a next SL SPS transmission period of the first SL SPS transmission associated with the first UE.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
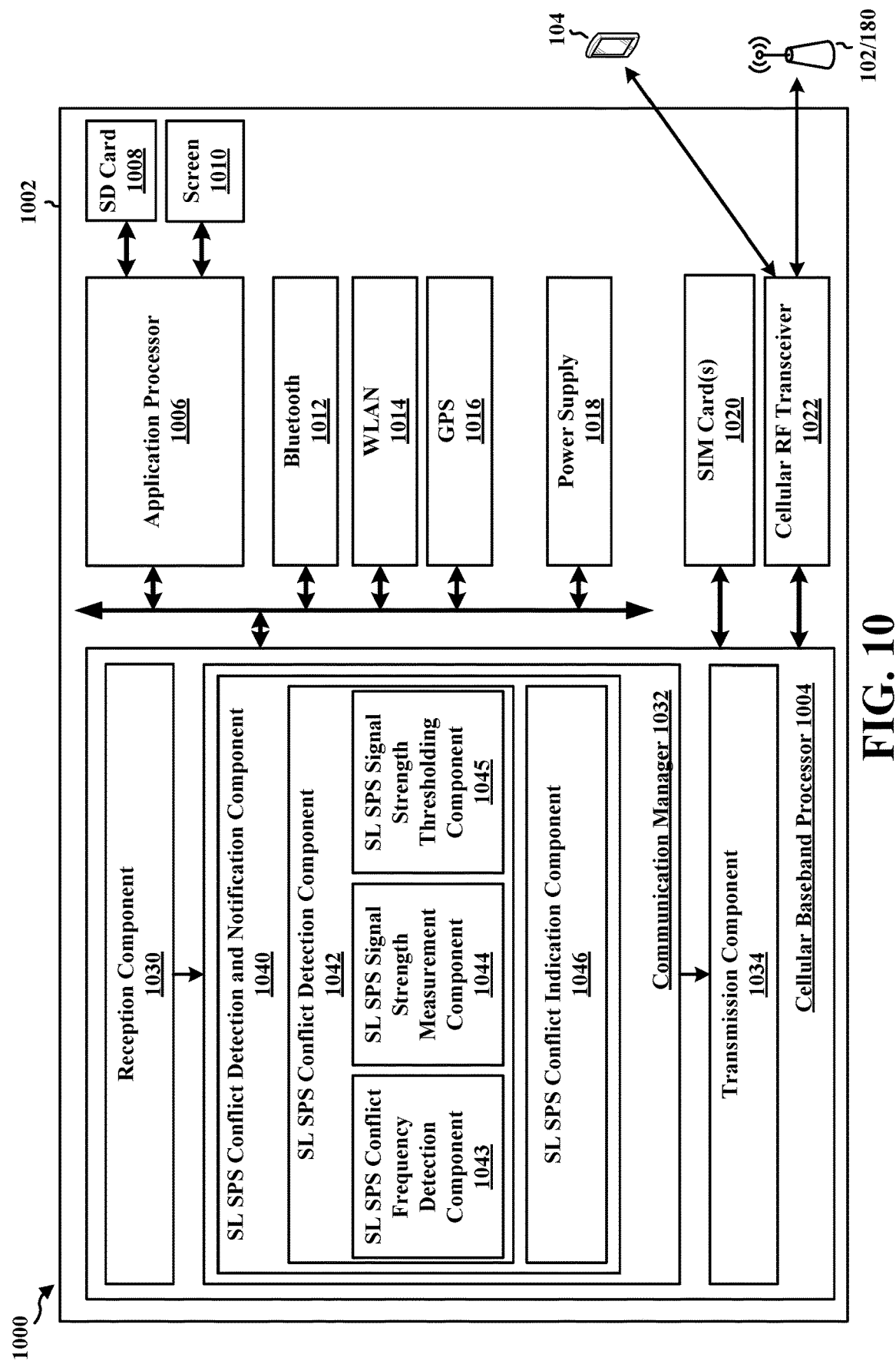
FIG. 10 is a diagram illustrating an example of a hardware implementation for an apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes an SL SPS conflict detection and notification component 1040 that is configured to detect at least one SPS conflict in a set of time-and-frequency resources between a first SL SPS transmission and a second SL SPS transmission, the first SL SPS transmission being associated with a first UE and the second SL SPS transmission being associated with a second UE; and transmit, upon detecting the at least one SPS conflict, an indication of the SPS conflict to at least one of the first UE and/or the second UE, the indication of the SPS conflict including information regarding the detected at least one SPS conflict between the first SL SPS transmission and the second SL SPS transmission, e.g., as described in connection with operations 802, 810, and 812 of FIG. 8. The SL SPS conflict detection and notification component 1040 includes an SL SPS conflict detection component 1042 that receives input in the form of SCI indicating potentially conflicting transmissions or potentially conflicting transmissions in a set of resources (e.g., time-and-frequency resources) and may be configured to process the received transmissions to detect an SL SPS conflict, e.g., as described in connection with 802 to 808 of FIG. 8. More specifically, SL SPS conflict detection component 1042 may include SL SPS conflict frequency detection component 1043 that is configured to determine that the first SL SPS transmission and the second SL SPS transmission are configured to result in at least one of (1) a number of conflicts over a period of time that is above a threshold number of conflicts or (2) conflicts with a periodicity that is below a threshold periodicity. The SL SPS conflict detection component 1042 may further include SL SPS signal strength measurement component 1044 that is configured to measure at least one of an RSRP for each of the first SL SPS transmission and the second SL SPS transmission or measure an RSRQ for at least one of the first SL SPS transmission and/or the second SL SPS transmission. The SL SPS conflict detection component 1042 may further include SL SPS signal strength thresholding component 1045 that is configured to determine that at least one of (1) a difference between RSRPs measured for the first SL SPS transmission and the second SL SPS transmission is above, or below, an RSRP difference threshold or (2) a measured RSRQ for at least one of the first SL SPS transmission and/or the second SL SPS transmission is below an RSRQ threshold. The SL SPS conflict detection and notification component 1040 further includes an SL SPS conflict notification component 1046 that receives input in the form of information regarding the resources involved in the detected SL SPS conflict from the SL SPS conflict detection component 1042 and is configured to transmit an indication of the SL SPS conflict to at least one UE associated with at least one SL SPS transmission involved in the conflict, e.g., as described in connection with 804 of FIG. 8.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, may include means for detecting at least one SPS conflict in a set of time-and-frequency resources between a first SL SPS transmission and a second SL SPS transmission, where the first SL SPS transmission is associated with a first UE and the second SL SPS transmission is associated with a second UE. The apparatus 1002, and in particular the cellular baseband processor 1004, may further include means for determining that the first SL SPS transmission and the second SL SPS transmission are configured to result in at least one of (1) a number of conflicts over a period of time that is above a threshold number of conflicts or (2) conflicts with a periodicity that is below a threshold periodicity. The apparatus 1002, and in particular the cellular baseband processor 1004, may further include means for measuring at least one of an RSRP for each of the first SL SPS transmission and the second SL SPS transmission or measuring an RSRQ for at least one of the first SL SPS transmission or the second SL SPS transmission. The apparatus 1002, and in particular the cellular baseband processor 1004, may further include means for determining that at least one of (1) a difference between RSRPs measured for the first SL SPS transmission and the second SL SPS transmission is above, or below an RSRP difference threshold or (2) a measured RSRQ for at least one of the first SL SPS transmission and/or the second SL SPS transmission is below an RSRQ threshold. The apparatus 1002, and in particular the cellular baseband processor 1004, may further include means for transmitting, upon detecting the at least one SPS conflict, an indication of the SPS conflict to at least one of the first UE and/or the second UE, the indication of the SPS conflict including information regarding the detected at least one SPS conflict between the first SL SPS transmission and the second SL SPS transmission. The apparatus 1002, and in particular the cellular baseband processor 1004, may further include means for receiving at least one of the first SL SPS transmission and/or the second SL SPS transmission in time-and-frequency resources that are not in the set of time-and-frequency resources based on the detecting and transmitting.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

SL communication resource allocation in some aspects of wireless communications (e.g., 5G NR) may not be centrally controlled. Instead, each UE may autonomously select resources for particular communications based on information available to the UE and/or based on negotiation with other UEs. For example, some aspects perform inter-UE coordination in a certain mode (e.g., Mode 2) based on a set of resources in frequency and time (e.g., subcarriers, symbols, resource blocks (RBs), REs, etc.) sent by a first UE (e.g., UE-A) to a second UE (e.g., UE-B). In some aspects, inter-UE coordination includes the first UE (UE-A) sending, to the second UE (UE-B), (1) a set of resources favored or specified for the second UE's transmission and (2) a set of resources not favored for the second UE's transmission.

SL transmissions from different UEs may result in conflicting communications being received in a set of time-and-frequency resources (e.g., a set of time and frequency resources defined by a time period and frequency range) at a receiving UE. Inter-UE coordination, in some aspects, may include sensing resources reserved or used by other UEs and transmitting information regarding the sensing (e.g., information identifying the resources reserved or used for transmissions for other UEs). The inter-UE coordination may also include detecting (e.g., identifying) conflicts between transmissions from different UEs and transmitting an indication of the detected conflicts to at least one of the UEs associated with the detected conflict. It may be beneficial to include details of the resource conflict. For example, it may be beneficial to identify the type of the resource conflict (e.g., high priority traffic conflict, recurring SPS conflicts, etc.). It may further be beneficial to specify a sensing operation for a first UE (UE-A) engaged in inter-UE coordination and to specify which type(s) of resource set information is(are) beneficial to particular cast type(s).

It may also be beneficial to specify (1) how a UE engaged in inter-UE coordination will determine a set of favored and not-favored resources, (2) when, and by which UE, the information regarding the favored and not-favored resources is sent, and (3) how to determine the UE pair to be engaged in inter-UE coordination. There may be further benefit by specifying (1) how a first UE engaged in inter-UE coordination transmits a determined set of (favored or not-favored) resources including a container used to carry the information (implicitly, explicitly, or both), (2) how a second UE receives the identified set of (favored or not-favored) resources and uses the information regarding the identified set of resources when performing resource selection for its own transmissions, and (3) how, or whether, to define the relationship between support/signalling of inter-UE coordination and cast type.

In an aspect of the disclosure, a method, a computer-readable medium, and an apparatus are provided for detecting, at a third UE (e.g., a UE-A engaging in an inter-UE coordination) at least one type of conflicting resources and transmitting an indication of the detected conflict to at least a first UE associated with the conflict. A first UE (e.g., a UE-B engaging in an inter-UE coordination) may receive the indication of the detected conflict and, based on the information included in the indication, may initiate a resource re-selection and transmit based on the resources selected by the resource re-selection. The method, computer-readable medium, and apparatus thus provide an identification of a set of resources where a resource conflict is determined and allow a UE that receives the set of resources to take the conflicted resources into account when performing a resource selection (or re-selection) for its own transmissions.

Further benefit is provided by applying different thresholds based on the type of conflict. For example, using a first stringent threshold for recurring and/or high-priority-traffic conflicts and a less stringent threshold for non-recurring or low priority traffic conflicts can avoid introducing unnecessary resource re-selections while still providing conflict resolution procedures for recurring or high-priority-traffic conflicts.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication for a third UE, the method including detecting at least one SPS conflict in a set of resources between a first SL transmission and a second SL transmission, the first SL transmission being associated with a first UE and the second SL transmission being associated with a second UE; and transmitting, upon detecting the at least one SPS conflict, an indication of the SPS conflict to at least one of the first UE or the second UE, the indication of the SPS conflict including information regarding the detected at least one SPS conflict between the first SL transmission and the second SL transmission.

Aspect 2 is the method of aspect 1, where the at least one SPS conflict includes at least one of a conflict in time or a conflict in time and frequency.

Aspect 3 is the method of any of aspects 1 and 2, where detecting the at least one SPS conflict between the first SL transmission and the second SL transmission includes determining that the first SL transmission and the second SL transmission are configured to result in a number of conflicts over a period of time that is above a threshold number of conflicts.

Aspect 4 is the method of aspect 3, where detecting the at least one SPS conflict between the first SL transmission and the second SL transmission further includes measuring a respective RSRP for each of the first SL transmission and the second SL transmission and determining that a difference between the respective RSRPs is below a RSRP difference threshold in a set of RSRP difference.

Aspect 5 is the method of aspect 4, where the set of RSRP difference thresholds includes a first RSRP difference threshold applied when a pair of SL transmissions is determined to be configured to result in a number of conflicts over the period of time that is above the threshold number of conflicts and a second RSRP difference threshold applied when the pair of SL transmissions is determined to not be configured to result in a number of conflicts over the period of time that is above the threshold number of conflicts, where the first RSRP difference threshold is greater than the second RSRP difference threshold.

Aspect 6 is the method of aspect 3, where detecting the at least one SPS conflict between the first SL transmission and the second SL transmission further includes measuring at least one RSRQ for at least one of the first SL transmission or the second SL transmission and determining that the at least one measured RSRQ is below an RSRQ threshold in a set of RSRQ thresholds.

Aspect 7 is the method of aspect 6, where the set of RSRQ thresholds comprises a first RSRQ threshold applied when a pair of SL transmissions is determined to be configured to result in a number of conflicts over the period of time that is above the threshold number of conflicts and a second RSRQ threshold applied when the pair of SL transmissions is determined to not be configured to result in a number of conflicts over the period of time that is above the threshold number of conflicts.

Aspect 8 is the method of aspect 7, where the first RSRQ threshold is greater than the second RSRQ threshold.

Aspect 9 is the method of any of aspects 1 to 8, where the indication of the SPS conflict is transmitted via one of a MAC-CE, SCI, or a PSFCH.

Aspect 10 is the method of any of aspects 1 to 9, where, based on the indication of the SPS conflict, at least one of the first SL transmission or the second SL transmission is re-transmitted.

Aspect 11 is the method of any of aspects 1 to 10, where at least one of the first SL transmission or the second SL transmission includes an SPS transmission.

Aspect 12 is the method of aspect 11, where, based on the indication of the SPS conflict, a resource re-selection for at least one SL SPS transmission of the first SL transmission or the second SL transmission for at least the set of resources is initiated for selecting resources to be used by the at least one SL SPS transmission for subsequent transmissions.

Aspect 13 is the method of aspect 12, where the at least one SL SPS transmission is transmitted via (1) the set of resources and (2) a group of resources in addition to the set of resources, and the resource re-selection corresponds to the set of resources and the group of resources.

Aspect 14 is the method of any of aspects 11 to 13, where both the first SL transmission and the second SL transmission include SPS transmissions.

Aspect 15 is a method of wireless communication for a first UE, the method including receiving, from a third UE, an indication of an SPS conflict, the indication of the SPS conflict including information regarding a set of resources with at least one conflict between a first SL transmission and a second SL transmission, where the first SL transmission is associated with the first UE and the second SL transmission is associated with a second UE; initiating a resource re-selection for the first SL transmission based on the received indication of the SPS conflict; and transmitting the first SL transmission based on the resource re-selection.

Aspect 16 is the method of aspect 15, where the at least one SPS conflict includes at least one of a conflict in time or a conflict in time and frequency.

Aspect 17 is the method of any of aspects 15 and 16, where the first SPS transmission and the second SL transmission are configured to result in at least one of (1) a number of conflicts over a period of time that is above a threshold number of conflicts or (2) conflicts with a periodicity that is below a threshold periodicity.

Aspect 18 is the method of aspect 17, where receiving, from the third UE, the indication of the SPS conflict is based on a magnitude of a difference between a first RSRP for the first SL transmission and a second RSRP for the second SL transmission that is below a RSRP difference threshold in a set of RSRP difference thresholds, where the set of RSRP difference thresholds includes a first RSRP difference threshold applied when a pair of SL transmissions is determined to be configured to result in a number of conflicts over the period of time that is above the threshold number of conflicts and a second RSRP difference threshold applied when the pair of SL transmissions is determined to not be configured to result in a number of conflicts over the period of time that is above the threshold number of conflicts, where the first RSRP difference threshold is greater than the second RSRP difference threshold.

Aspect 19 is the method of aspect 18, where receiving, from the third UE, the indication of the SPS conflict is based on a RSRQ for at least one of the first SL transmission or the second SL transmission that is below an RSRQ threshold in a set of RSRQ thresholds, where the set of RSRQ thresholds includes a first RSRQ threshold applied when a pair of SL transmissions is determined to be configured to result in a number of conflicts over the period of time that is above the threshold number of conflicts and a second RSRQ threshold applied when the pair of SL transmissions is determined to not be configured to result in a number of conflicts over the period of time that is above the threshold number of conflicts.

Aspect 20 is the method of aspect 19, where the first RSRQ threshold is greater than the second RSRQ threshold.

Aspect 21 is the method of any of aspects 15 to 20, where the indication of the SPS conflict is received via one of a MAC-CE, SCI, or a PSFCH.

Aspect 22 is the method of any of aspects 15 to 21, where, based on the indication of the SPS conflict, at least one of the first SL transmission or the second SL transmission is re-transmitted.

Aspect 23 is the method of any of aspects 15 to 22, where the resource re-selection is a resource re-selection for resources used to transmit subsequent SL transmissions for the first SL transmission associated with the first UE, and transmitting the first SL transmission based on the resource re-selection includes transmitting a subsequent SL transmission of the first SL transmission via the resources selected by the resource re-selection.

Aspect 24 is the method of aspect 23, where the first SL transmission is transmitted via (1) the set of resources and (2) a group of resources in addition to the set of resources, and the resource re-selection corresponds to the set of resources and the group of resources.

Aspect 25 is the method of any of aspects 15 to 24, further including transmitting a second indication that at least the set of resources reserved for the first SL transmission associated with the first UE will be released before a next SL SPS transmission period of the first SL transmission associated with the first UE.

Aspect 26 is the method of aspect 25, where the second indication is transmitted in SCI and the second indication indicates that a reservation period for at least the set of resources is set to zero.

Aspect 27 is the method of any of aspects 25 and 26, where, based on releasing the set of resources, an additional resource re-selection is initiated for subsequent SL SPS transmissions of the first SL transmission.

Aspect 28 is the method of any of aspects 15 to 27, where at least one of the first SL transmission or the second SL transmission includes an SPS transmission.

Aspect 29 is the method of aspect 28, where both the first SL transmission and the second SL transmission include SPS transmissions.

Aspect 30 is an apparatus for wireless communication including at least one processor coupled to a memory and configured to implement a method as in any of aspects 1 to 29.

Aspect 31 is an apparatus for wireless communication including means for implementing a method as in any of aspects 1 to 29.

Aspect 32 is a computer-readable medium storing computer executable code, where the code when executed by a processor causes the processor to implement a method as in any of aspects 1 to 29.

What is claimed is:

1. An apparatus for wireless communication, comprising:
    a memory; and
    one or more processors coupled to the memory and configured to cause the apparatus to:
        measure (i) one of respective reference signal received powers (RSRPs) for each of a first sidelink (SL) transmission associated with a first user equipment (UE) and a second SL transmission associated with a second UE or (ii) at least one reference signal received quality (RSRQ) for at least one of the first SL transmission or the second SL transmission; and
        detect at least one semi-persistent scheduling (SPS) conflict in a set of resources between the first SL transmission and the second SL transmission based on (i) a magnitude of a difference between the respective RSRPs being below a RSRP difference threshold in a set of RSRP difference thresholds or (ii) the at least one measured RSRQ being below an RSRQ threshold in a set of RSRQ thresholds,
        wherein to detect the at least one SPS conflict between the first SL transmission and the second SL transmission, the one or more processors are configured to cause the apparatus to determine if the first SL transmission and the second SL transmission are configured to result in a number of conflicts over a period of time that is above a threshold number of conflicts; and
        transmit, upon detection of the at least one SPS conflict, an indication of the SPS conflict to at least one of the first UE or the second UE, the indication of the SPS conflict including information regarding the detected at least one SPS conflict between the first SL transmission and the second SL transmission,
        wherein:
            (i) the set of RSRP difference thresholds comprises a first RSRP difference threshold configured to be applied when a pair of SL transmissions is determined to be configured to result in the number of conflicts over the period of time that is above the threshold number of conflicts, the set of RSRP difference thresholds comprises a second RSRP difference threshold configured to be applied when the pair of SL transmissions is determined to not be configured to result in the number of conflicts over the period of time that is above the threshold number of conflicts, and the first RSRP difference threshold is greater than the second RSRP difference threshold; or
            (ii) the set of RSRQ thresholds comprises a first RSRQ threshold configured to be applied when a pair of SL transmissions is determined to be configured to result in the number of conflicts over the period of time that is above the threshold number of conflicts and the set of RSRQ thresholds comprises a second RSRQ threshold configured to be applied when the pair of SL transmissions is determined to not be configured to result in the number of conflicts over the period of time that is above the threshold number of conflicts.

2. The apparatus of claim 1, wherein the at least one SPS conflict comprises at least one of a conflict in time or a conflict in time and frequency.

3. The apparatus of claim 1, wherein:
    the one or more processors are configured to cause the apparatus to measure the one of respective reference signal received powers (RSRPs) for each of the first SL transmission associated with the first UE and the second SL transmission associated with the second UE;
    the one or more processors are configured to cause the apparatus to detect the at least one SPS conflict in the set of resources between the first SL transmission and the second SL transmission based on the magnitude of the difference between the respective RSRPs being below the RSRP difference threshold in the set of RSRP difference thresholds; and
    the set of RSRP difference thresholds comprises;
        the first RSRP difference threshold configured to be applied when the pair of SL transmissions is determined to be configured to result in the number of conflicts over the period of time that is above the threshold number of conflicts; and
        the second RSRP difference threshold configured to be applied when the pair of SL transmissions is determined to not be configured to result in the number of conflicts over the period of time that is above the threshold number of conflicts,
    wherein the first RSRP difference threshold is greater than the second RSRP difference threshold.

4. The apparatus of claim 1, wherein:
    the one or more processors are configured to cause the apparatus to measure at least one reference signal received quality (RSRQ) for at least one of the first SL transmission or the second SL transmission;

the one or more processors are configured to cause the apparatus to detect at least one semi-persistent scheduling (SPS) conflict in a set of resources between the first SL transmission and the second SL transmission based on the at least one measured RSRQ being below an RSRQ threshold in a set of RSRQ thresholds; and the set of RSRQ thresholds comprises:

the first RSRQ threshold configured to be applied when the pair of SL transmissions is determined to be configured to result in the number of conflicts over the period of time that is above the threshold number of conflicts; and the second RSRQ threshold configured to be applied when the pair of SL transmissions is determined to not be configured to result in the number of conflicts over the period of time that is above the threshold number of conflicts.

5. The apparatus of claim 4, wherein the first RSRQ threshold is greater than the second RSRQ threshold.

6. The apparatus of claim 1, wherein to transmit the indication of the SPS, the one or more processors are configured to cause the apparatus to transmit the indication of the SPS conflict via one of a medium access control (MAC) control element (MAC-CE), sidelink control information (SCI), or a physical sidelink feedback channel (PSFCH).

7. The apparatus of claim 1, wherein a retransmission of at least one of the first SL transmission or the second SL transmission is, based on the indication of the SPS conflict.

8. The apparatus of claim 1, wherein at least one of the first SL transmission or the second SL transmission comprises an SPS transmission.

9. The apparatus of claim 8, wherein the one or more processors are configured to cause the apparatus to, based on the indication of the SPS conflict, initiate a resource re-selection for at least one SL SPS transmission of the first SL transmission or the second SL transmission for at least the set of resources, wherein the initiation of the resource re-selection is for selecting resources to be used by the at least one SL SPS transmission for subsequent transmissions.

10. The apparatus of claim 8, wherein both the first SL transmission and the second SL transmission comprise SPS transmissions.

11. An apparatus for wireless communication, comprising:

a memory; and one or more processors coupled to the memory and configured to cause the apparatus to:

measure (i) one of respective reference signal received powers (RSRPs) for each of a first sidelink (SL) transmission associated with a first user equipment (UE) and a second SL transmission associated with a second UE or (ii) at least one reference signal received quality (RSRQ) for at least one of the first SL transmission or the second SL transmission; and detect at least one semi-persistent scheduling (SPS) conflict in a set of resources between the first SL transmission and the second SL transmission based on (i) a magnitude of a difference between the respective RSRPs being below a RSRP difference threshold in a set of RSRP difference thresholds or (ii) the at least one measured RSRQ being below an RSRQ threshold in a set of RSRQ thresholds; and transmit, upon detection of the at least one SPS conflict, an indication of the SPS conflict to at least one of the first UE or the second UE, the indication of the SPS conflict including information regarding the detected at least one SPS conflict between the first SL transmission and the second SL transmission, wherein at least one of the first SL transmission or the second SL transmission comprises an SPS transmission, wherein the one or more processors are configured to cause the apparatus to, based on the indication of the SPS conflict, initiate a resource re-selection for at least one SL SPS transmission of the first SL transmission or the second SL transmission for at least the set of resources, wherein the initiation of the resource re-selection is for selecting resources to be used by the at least one SL SPS transmission for subsequent transmissions, wherein the at least one SL SPS transmission is via (1) the set of resources and (2) a group of resources in addition to the set of resources, and wherein the resource re-selection comprises a reselection of the set of resources and the group of resources.

12. A method of wireless communication, comprising:

measuring (i) one of respective reference signal received powers (RSRPs) for each of a first sidelink (SL) transmission associated with a first user equipment (UE) and a second SL transmission associated with a second UE or (ii) at least one reference signal received quality (RSRQ) for at least one of the first SL transmission or the second SL transmission; and detecting at least one semi-persistent scheduling (SPS) conflict in a set of resources between the first SL transmission and the second SL transmission based on (i) a magnitude of a difference between the respective RSRPs being below a RSRP difference threshold in a set of RSRP difference thresholds or (ii) the at least one measured RSRQ being below an RSRQ threshold in a set of RSRQ thresholds, wherein the detecting comprises determining if the first SL transmission and the second SL transmission are configured to result in a number of conflicts over a period of time that is above a threshold number of conflicts; and transmitting, upon detection of the at least one SPS conflict, an indication of the SPS conflict to at least one of the first UE or the second UE, the indication of the SPS conflict including information regarding the detected at least one SPS conflict between the first SL transmission and the second SL transmission, wherein:

(i) the set of RSRP difference thresholds comprises a first RSRP difference threshold applied when a pair of SL transmissions is determined to be configured to result in the number of conflicts over the period of time that is above the threshold number of conflicts, the set of RSRP difference thresholds comprises a second RSRP difference threshold applied when the pair of SL transmissions is determined to not be configured to result in the number of conflicts over the period of time that is above the threshold number of conflicts, and the first RSRP difference threshold is greater than the second RSRP difference threshold; or (ii) the set of RSRQ thresholds comprises a first RSRQ threshold applied when a pair of SL transmissions is determined to be configured to result in the number of conflicts over the period of time that is above the threshold number of conflicts and the set of RSRQ thresholds comprises a second RSRQ threshold applied when the pair of SL transmissions is determined to not be configured to result in the number of conflicts over the period of time that is above the threshold number of conflicts.

13. The method of claim 12, wherein the at least one SPS conflict comprises at least one of a conflict in time or a conflict in time and frequency.

14. The method of claim 12, comprising:
measuring the one of respective reference signal received powers (RSRPs) for each of the first SL transmission associated with the first UE and the second SL transmission associated with the second UE;
detecting the at least one SPS conflict in the set of resources between the first SL transmission and the second SL transmission based on the magnitude of the difference between the respective RSRPs being below the RSRP difference threshold in the set of RSRP difference thresholds,
wherein the set of RSRP difference thresholds comprises:
the first RSRP difference threshold applied when the pair of SL transmissions is determined to be configured to result in the number of conflicts over the period of time that is above the threshold number of conflicts; and
the second RSRP difference threshold applied when the pair of SL transmissions is determined to not be configured to result in the number of conflicts over the period of time that is above the threshold number of conflicts,
wherein the first RSRP difference threshold is greater than the second RSRP difference threshold.

15. The method of claim 12, comprising:
measuring at least one reference signal received quality (RSRQ) for at least one of the first SL transmission or the second SL transmission;
detecting at least one semi-persistent scheduling (SPS) conflict in a set of resources between the first SL transmission and the second SL transmission based on the at least one measured RSRQ being below an RSRQ threshold in a set of RSRQ thresholds,
wherein the set of RSRQ thresholds comprises:
the first RSRQ threshold applied when the pair of SL transmissions is determined to be configured to result in the number of conflicts over the period of time that is above the threshold number of conflicts; and
the second RSRQ threshold applied when the pair of SL transmissions is determined to not be configured to result in the number of conflicts over the period of time that is above the threshold number of conflicts.

16. The method of claim 15, wherein the first RSRQ threshold is greater than the second RSRQ threshold.

17. The method of claim 12, comprising: transmitting the indication of the SPS conflict via one of a medium access control (MAC) control element (MAC-CE), sidelink control information (SCI), or a physical sidelink feedback channel (PSFCH).

18. The method of claim 12, wherein a retransmission of at least one of the first SL transmission or the second SL transmission is based on the indication of the SPS conflict.

19. The method of claim 12, wherein at least one of the first SL transmission or the second SL transmission comprises an SPS transmission.

20. The method of claim 19, comprising:
initiating, based on the indication of the SPS conflict, a resource re-selection for at least one SL SPS transmission of the first SL transmission or the second SL transmission for at least the set of resources,
wherein the initiation of the resource re-selection is for selecting resources to be used by the at least one SL SPS transmission for subsequent transmissions.

21. The method of claim 19, wherein both the first SL transmission and the second SL transmission comprise SPS transmissions.

22. A method of wireless communication, comprising:
measuring (i) one of respective reference signal received powers (RSRPs) for each of a first sidelink (SL) transmission associated with a first user equipment (UE) and a second SL transmission associated with a second UE or (ii) at least one reference signal received quality (RSRQ) for at least one of the first SL transmission or the second SL transmission; and
detecting at least one semi-persistent scheduling (SPS) conflict in a set of resources between the first SL transmission and the second SL transmission based on (i) a magnitude of a difference between the respective RSRPs being below a RSRP difference threshold in a set of RSRP difference thresholds or (ii) the at least one measured RSRQ being below an RSRQ threshold in a set of RSRQ thresholds;
transmitting, upon detection of the at least one SPS conflict, an indication of the SPS conflict to at least one of the first UE or the second UE, the indication of the SPS conflict including information regarding the detected at least one SPS conflict between the first SL transmission and the second SL transmission,
wherein at least one of the first SL transmission or the second SL transmission comprises an SPS transmission; and
initiating, based on the indication of the SPS conflict, a resource re-selection for at least one SL SPS transmission of the first SL transmission or the second SL transmission for at least the set of resources,
wherein the initiation of the resource re-selection is for selecting resources to be used by the at least one SL SPS transmission for subsequent transmissions, and
wherein the at least one SL SPS transmission is via (1) the set of resources and (2) a group of resources in addition to the set of resources, and
wherein the resource re-selection comprises a reselection of the set of resources and the group of resources.

* * * * *